US012444426B2

(12) United States Patent
Villemoes et al.

(10) Patent No.: US 12,444,426 B2
(45) Date of Patent: *Oct. 14, 2025

(54) VOICE ENCODING AND DECODING USING TRANSFORM COEFFICIENTS ADJUSTED BY SPECTRAL MODEL AND SPECTRAL SHAPER

(71) Applicant: DOLBY INTERNATIONAL AB, Dublin (IE)

(72) Inventors: Lars Villemoes, Jarfalla (SE); Janusz Klejsa, Solna (SE); Per Hedelin, Gothenburg (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,251

(22) Filed: Mar. 31, 2023

(65) Prior Publication Data

US 2023/0238011 A1 Jul. 27, 2023

Related U.S. Application Data

(63) Continuation of application No. 16/719,857, filed on Dec. 18, 2019, now Pat. No. 11,621,009, which is a (Continued)

(51) Int. Cl.
*G10L 19/032* (2013.01)
*G10L 19/02* (2013.01)
*G10L 19/06* (2013.01)

(52) U.S. Cl.
CPC ............ *G10L 19/032* (2013.01); *G10L 19/02* (2013.01); *G10L 19/06* (2013.01)

(58) Field of Classification Search
CPC ... G10L 19/18–24; G10L 19/02; G10L 19/06; G10L 19/032
See application file for complete search history.

(56) References Cited

U.S. PATENT DOCUMENTS 5,394,473 A 2/1995 Davidson
5,530,750 A 6/1996 Akagiri
(Continued)

FOREIGN PATENT DOCUMENTS

CA 2730198 C 1/2010
CN 101527138 B 9/2009
(Continued)

OTHER PUBLICATIONS

Brandenburg, Karlheinz "MP3 and AAC Explained" 15th International Conference: Audio Acoustics and Small Spaces, Audio Engineering Society, Jan. 1, 1999, pp. 99-110.
(Continued)

*Primary Examiner* — Michael N Opsasnick

(57) ABSTRACT

The present document relates an audio encoding and decoding system (referred to as an audio codec system). In some embodiments, a method of audio signal encoding comprises: receiving an input audio signal; transforming a sequence of samples of the input audio signal into a block of transform coefficients, the transform coefficients indicative of the spectral energy of the block; estimating a spectral envelope of the block from the transform coefficients; adjusting the transform coefficients using the spectral envelope and a spectral shaper, the spectral shaper including one or more parameters indicative of a fundamental frequency of a multi-sinusoidal signal model, where the fundamental frequency corresponds to a time domain delay; and entropy coding the adjusted transform coefficients.

3 Claims, 6 Drawing Sheets

Figure 1A:
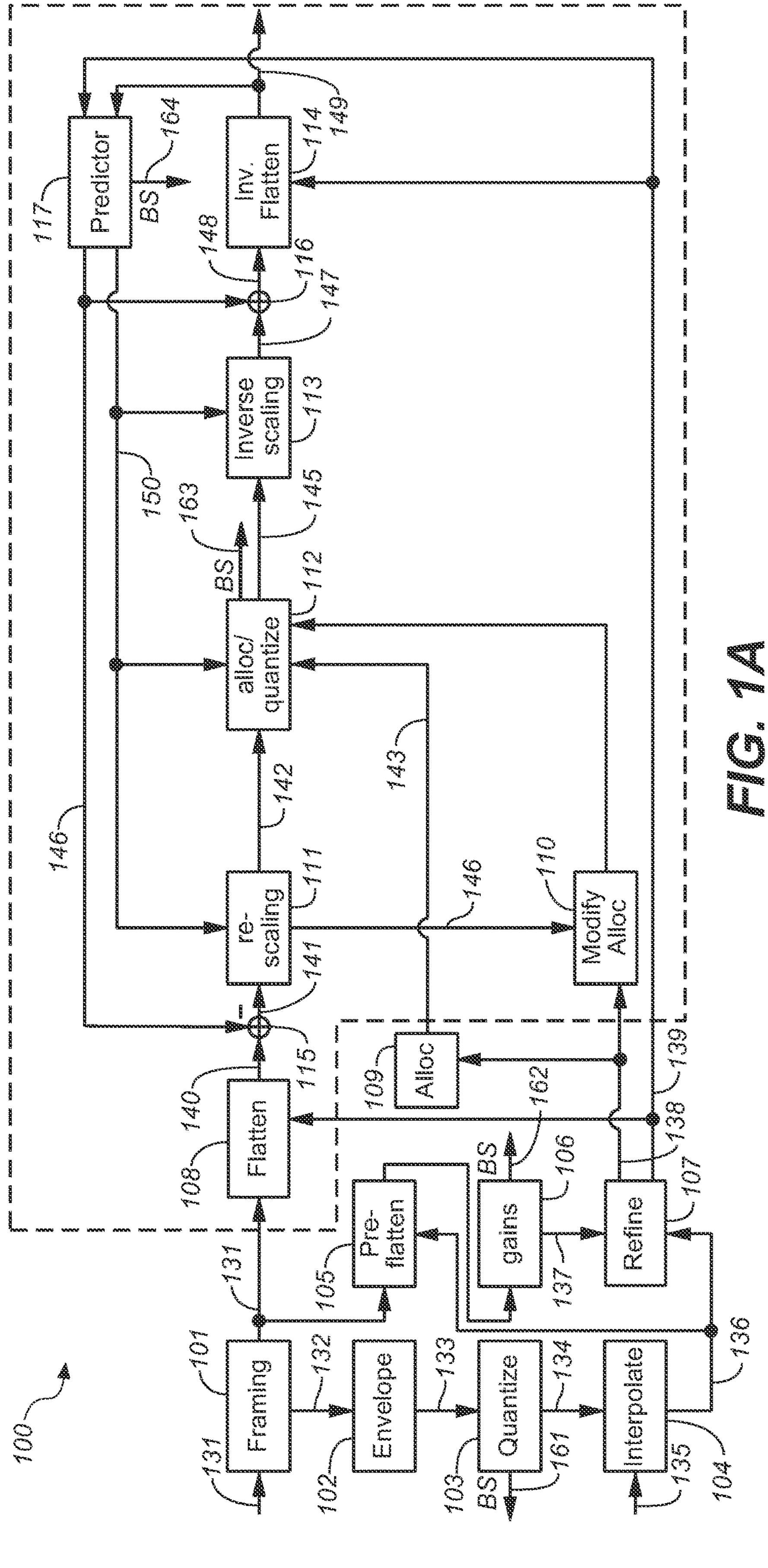

Related U.S. Application Data continuation of application No. 16/032,921, filed on Jul. 11, 2018, now Pat. No. 10,515,647, which is a continuation of application No. 14/781,219, filed as application No. PCT/EP2014/056851 on Apr. 4, 2014, now Pat. No. 10,043,528.

(60) Provisional application No. 61/875,553, filed on Sep. 9, 2013, provisional application No. 61/808,675, filed on Apr. 5, 2013.

(56) References Cited

U.S. PATENT DOCUMENTS

| | | | |
|---|---|---|---|
| 5,751,903 | A | 5/1998 | Swaminathan |
| 6,636,830 | B1 | 10/2003 | Princen |
| 6,895,375 | B2 | 5/2005 | Malah |
| 6,963,842 | B2 | 11/2005 | Goodwin |
| 6,978,236 | B1 | 12/2005 | Liljeryd |
| 7,039,581 | B1 * | 5/2006 | Stachurski .............. G10L 19/20 704/208 |
| 7,325,023 | B2 | 1/2008 | Youn |
| 7,363,216 | B2 | 4/2008 | Absar |
| 7,388,853 | B2 * | 6/2008 | Ptasinski ............... H04L 1/0006 370/349 |
| 7,876,966 | B2 | 1/2011 | Ojanpera |
| 7,930,173 | B2 | 4/2011 | Fujii |
| 7,987,089 | B2 | 7/2011 | Krishnan |
| 8,032,362 | B2 | 10/2011 | Choo |
| 8,078,301 | B2 | 12/2011 | Srinivasan |
| 8,095,359 | B2 | 1/2012 | Boehm |
| 8,095,360 | B2 | 1/2012 | Gao |
| 8,214,200 | B2 | 7/2012 | Cabot |
| 8,352,279 | B2 | 1/2013 | Gao |
| 8,484,019 | B2 | 7/2013 | Hedelin |
| 8,494,863 | B2 | 7/2013 | Biswas |
| 9,280,975 | B2 | 3/2016 | Sung |
| 9,487,224 | B1 | 11/2016 | Pless |
| 10,043,528 | B2 * | 8/2018 | Villemoes ............. G10L 19/032 |
| 10,515,647 | B2 * | 12/2019 | Villemoes ............... G10L 19/02 |
| 11,621,009 | B2 * | 4/2023 | Villemoes ............... G10L 19/02 704/203 |
| 2003/0004711 | A1 | 1/2003 | Koishida |
| 2003/0093278 | A1 | 5/2003 | Malah |
| 2007/0027682 | A1 | 2/2007 | Bennett |
| 2007/0055508 | A1 * | 3/2007 | Zhao ................... G10L 21/0216 704/226 |
| 2007/0088558 | A1 * | 4/2007 | Vos ....................... G10L 19/038 704/275 |
| 2007/0270987 | A1 | 11/2007 | Fujii |
| 2008/0027711 | A1 * | 1/2008 | Rajendran ............. G10L 19/167 704/201 |
| 2008/0027716 | A1 * | 1/2008 | Rajendran ............. G10L 19/012 704/E19.006 |
| 2008/0052068 | A1 * | 2/2008 | Aguilar ................. G10L 19/093 704/E19.03 |
| 2008/0126086 | A1 | 5/2008 | Vos |
| 2008/0226097 | A1 | 9/2008 | Miyashita |
| 2009/0012797 | A1 | 1/2009 | Boehm |
| 2009/0046593 | A1 * | 2/2009 | Ptasinski ............... H04L 12/413 370/252 |
| 2009/0074240 | A1 | 3/2009 | Srinivasan |
| 2009/0110208 | A1 | 4/2009 | Choo |
| 2009/0157413 | A1 | 6/2009 | Oshikiri |
| 2009/0177466 | A1 | 7/2009 | Rui |
| 2009/0279598 | A1 | 11/2009 | Moriya |
| 2010/0017197 | A1 | 1/2010 | Oshikiri |
| 2010/0023322 | A1 | 1/2010 | Schnell |
| 2010/0042408 | A1 | 2/2010 | Malah |
| 2010/0063803 | A1 | 3/2010 | Gao |
| 2010/0063808 | A1 * | 3/2010 | Gao ........................ G10L 19/03 704/226 |
| 2010/0063810 | A1 | 3/2010 | Gao |
| 2010/0121646 | A1 | 5/2010 | Ragot |
| 2010/0174538 | A1 | 7/2010 | Vos |
| 2010/0179808 | A1 | 7/2010 | Brown |
| 2010/0217609 | A1 | 8/2010 | Oshikiri |
| 2010/0262420 | A1 | 10/2010 | Herre |
| 2010/0286990 | A1 | 11/2010 | Biswas |
| 2010/0286991 | A1 | 11/2010 | Hedelin |
| 2010/0290524 | A1 | 11/2010 | Lu |
| 2011/0010168 | A1 | 1/2011 | Yu |
| 2011/0026717 | A1 | 2/2011 | Nakagawa |
| 2011/0035212 | A1 | 2/2011 | Briand |
| 2011/0295598 | A1 * | 12/2011 | Yang ..................... G10L 21/038 704/205 |
| 2012/0016667 | A1 | 1/2012 | Gao |
| 2012/0016668 | A1 | 1/2012 | Gao |
| 2012/0033835 | A1 | 2/2012 | Gough |
| 2012/0116769 | A1 | 5/2012 | Malah |
| 2012/0213378 | A1 | 8/2012 | Liljeryd |
| 2012/0245947 | A1 | 9/2012 | Neuendorf |
| 2012/0253797 | A1 | 10/2012 | Geiger |
| 2012/0265534 | A1 * | 10/2012 | Coorman .............. G10L 13/033 704/265 |
| 2013/0124215 | A1 | 5/2013 | Lecomte |
| 2013/0144613 | A1 | 6/2013 | Hardwick |
| 2013/0173271 | A1 | 7/2013 | Wu |
| 2013/0173272 | A1 | 7/2013 | Wu |
| 2013/0282368 | A1 | 10/2013 | Choo |
| 2013/0290003 | A1 | 10/2013 | Choo |
| 2014/0149124 | A1 | 5/2014 | Choo |
| 2014/0257827 | A1 * | 9/2014 | Norvell ................. G10L 21/038 704/500 |
| 2016/0064007 | A1 | 3/2016 | Villemoes |

FOREIGN PATENT DOCUMENTS

| | | | |
|---|---|---|---|
| CN | 101572586 | | 11/2009 |
| CN | 101661750 | B | 3/2010 |
| CN | 101939781 | B | 1/2011 |
| CN | 102150205 | | 8/2011 |
| EP | 0673014 | | 9/1995 |
| EP | 0673014 | B1 | 8/2000 |
| EP | 2235719 | B1 | 5/2018 |
| JP | H08-44399 | | 2/1996 |
| JP | 2002123298 | | 4/2002 |
| JP | 2014515124 | | 6/2014 |
| RU | 2251795 | C2 | 5/2005 |
| RU | 2321901 | | 4/2008 |
| RU | 2427978 | | 8/2011 |
| RU | 2011131717 | | 2/2013 |
| WO | 2009086918 | | 7/2009 |
| WO | 2010003618 | | 1/2010 |
| WO | 2011042464 | | 4/2011 |
| WO | 2011110031 | | 9/2011 |
| WO | 2011114933 | | 9/2011 |
| WO | 2012070866 | | 5/2012 |
| WO | 2012110415 | | 8/2012 |
| WO | 2012146757 | A1 | 11/2012 |
| WO | 2013002696 | | 1/2013 |
| WO | 2014108393 | | 7/2014 |

OTHER PUBLICATIONS

Davidson, G.A. "Digital Audio Coding: Dolby AC-3" Digital Signal Processing Handbook, CRC Press LLC, Jan. 1, 1999.

Hermansky, H. et al "Spectral Envelope Sampling and Interpolation in Linear Predictive Analysis of Speech" IEEE International Conference on ICASSP, vol. 9, pp. 53-56, published on Mar. 19-21, 1984.

Herre, J. et al "Extending the MPEG-4 AAC Codec by Perceptual Noise Substitution" Preprints of Papers Presented at the AES Convention, Jan. 1, 1998, pp. 1-14.

Hu, Kai-Liang, et al "New Algorithm of Perceptual Weighting Filter used in CELP Wideband Speech Codec" Journal of Zhejiang University, Jan. 2009, vol. 36, No. 1.

ISO/IEC FDIS 23003-3:2011 (E), Information Technology—MPEG Audio Technologies—Part 3: Unified Speech and Audio Coding, ISO/IEC JTC 1/SC 29/WG 11 Sep. 20, 2011.

(56) References Cited

OTHER PUBLICATIONS

Neuendorf, M. et al "MPEG Unified Speech and Audio Coding—The ISO/MPEG Standard for High-Efficiency Audio Coding of all Content Types" presented at the 132nd Convention, Apr. 26-29, 2012, Budapest, Hungary.
Quackenbush, S. "MPEG Unified Speech and Audio Coding" IEEE Multimedia, vol. 20, No. 2, Apr. 1, 2013, pp. 72-78.
Ramprashad, Sean A. "The Multimode Transform Predictive Coding Paradigm" IEEE Transactions on Speech and Audio Processing, vol. 11, No. 2, Mar. 2003, pp. 117-129.
Rapporteur Q6/16 "Draft Revised Technical Paper HSTP-MCTB (ex HSTP-MCTA (V2) Media Coding Toolbox for IPTV: Audio and Video Codecs" MPEG Meeting, Jul. 11, 2009, p. 5-9.
Valin, Jean-Marc et al "A High-Quality Speech and Audio Codec with Less Than 10 ms Delay" IEEE Transactions on Audio, Speech, and Language Processing, vol. 18, Issue 1, pp. 58-67, May 15, 2009.
ATSC Standard: Digital Audio Compression (AC-3). Advanced Television Systems Committee. Doc. A/52:2012. (Dec. 17, 2012), pp. 1-270.

* cited by examiner

VOICE ENCODING AND DECODING USING TRANSFORM COEFFICIENTS ADJUSTED BY SPECTRAL MODEL AND SPECTRAL SHAPER

CROSS-REFERENCE TO RELATED APPLICATIONS

This application is a Continuation of U.S. patent application Ser. No. 16/719,857 filed Dec. 18, 2019 which is a Continuation of U.S. patent application Ser. No. 16/032,921 filed Jul. 11, 2018, now issued as U.S. Pat. No. 10,515,647 granted Dec. 24, 2019 which is a Continuation of U.S. patent application Ser. No. 14/781,219 filed Sep. 29, 2015, now issued as U.S. Pat. No. 10,043,528 granted Aug. 7, 2018 which was a U.S. 371 National Phase of the International Application No. PCT/EP2014/056851 filed Apr. 4, 2014 which claims priority from U.S. Application No. 61/875,553 filed Sep. 9, 2013 and U.S. Application No. 61/808,675 filed Apr. 5, 2013, which are hereby incorporated by reference in their entirety.

TECHNICAL FIELD

The present document relates an audio encoding and decoding system (referred to as an audio codec system). In particular, the present document relates to a transform-based audio codec system which is particularly well suited for voice encoding/decoding.

BACKGROUND

General purpose perceptual audio coders achieve relatively high coding gains by using transforms such as the Modified Discrete Cosine Transform (MDCT) with block sizes of samples which cover several tenths of milliseconds (e.g. 20 ms). An example for such a transform-based audio codec system is Advanced Audio Coding (AAC) or High Efficiency (HE)-AAC. However, when using such transform-based audio codec systems for voice signals, the quality of voice signals degrades faster than that of musical signals towards lower bitrates, especially in the case of dry (non-reverberant) speech signals.

Hence, transform-based audio codec systems are not inherently well suited for the coding of voice signals or for the coding of audio signals comprising a voice component. In other words, transform-based audio codec systems exhibit an asymmetry with regards to the coding gain achieved for musical signals compared to the coding gain achieved for voice signals. This asymmetry may be addressed by providing add-ons to transform-based coding, wherein the add-ons aim at an improved spectral shaping or signal matching. Examples for such add-ons are pre/post shaping, Temporal Noise Shaping (TNS) and Time Warped MDCT. Furthermore, this asymmetry may be addressed by the incorporation of a classical time domain speech coder based on short term prediction filtering (LPC) and long term prediction (LTP).

It can be shown that the improvements obtained by providing add-ons to transform-based coding are typically not sufficient to even out the performance gap between the coding of music signals and speech signals. On the other hand, the incorporation of a classical time domain speech coder fills the performance gap, however, to the extent that the performance asymmetry is reversed to the opposite direction. This is due to the fact that classical time domain speech coders model the human speech production system and have been optimized for the coding of speech signals.

In view of the above, a transform-based audio codec may be used in combination with a classical time domain speech codec, wherein the classical time domain speech codec is used for speech segments of an audio signal and wherein the transform-based codec is used for the remaining segments of the audio signal. However, the coexistence of a time domain and a transform domain codec in a single audio codec system requires reliable tools for switching between the different codecs, based on the properties of the audio signal. In addition, the actual switching between a time domain codec (for speech content) and a transform domain codec (for the remaining content) may be difficult to implement. In particular, it may be difficult to ensure a smooth transition between the time domain codec and the transform domain codec (and vice versa). Furthermore, modifications to the time-domain codec may be required in order to make the time-domain codec more robust for the unavoidable occasional encoding of non-speech signals, for example for the encoding of a singing voice with instrumental background.

The present document addresses the above mentioned technical problems of audio codec systems. In particular, the present document describes an audio codec system which translates only the critical features of a speech codec and thereby achieves an even performance for speech and music, while staying within the transform-based codec architecture. In other words, the present document describes a transform-based audio codec which is particularly well suited for the encoding of speech or voice signals.

SUMMARY

According to an aspect a transform-based speech encoder is described. The speech encoder is configured to encode a speech signal into a bitstream. It should be noted that in the following, various aspects of such a transform-based speech encoder are described. It is explicitly pointed out that these aspects can be combined with one another in various manners. In particular, the aspects described in dependence of different independent claims can be combined with the other independent claims. Furthermore, the aspects described in the context of an encoder are applicable in an analogous manner to the corresponding decoder.

The speech encoder may comprise a framing unit configured to receive a set of blocks. The set of blocks may correspond to the shifted set of blocks described in the detailed description of the present document. Alternatively, the set of blocks may correspond to the current set of blocks described in the detailed description of the present document. The set of blocks comprises a plurality of sequential blocks of transform coefficients, and the plurality of sequential blocks is indicative of samples of the speech signal. In particular, the set of blocks may comprise four or more blocks of transform coefficients. A block of the plurality of sequential blocks may have been determined from the speech signal using a transform unit which is configured to transform a pre-determined number of samples of the speech signal from the time domain into the frequency domain. In particular, the transform unit may be configured to perform a time domain to frequency domain transform such as a Modified Discrete Cosine Transform (MDCT). As such, a block of transform coefficients may comprise a plurality of transform coefficients (also referred to as frequency coefficients or spectral coefficients) for a corresponding plurality of frequency bins. In particular, a block of transform coefficients may comprise MDCT coefficients.

The number of frequency bins or the size of a block typically depends on the size of the transform performed by the transform unit. In a preferred example, the blocks from the plurality of sequential blocks correspond to so-called short blocks, comprising e.g. 256 frequency bins. In addition to short blocks, the transform unit may be configured to generate so-called long blocks, comprising e.g. 1024 frequency bins. The long blocks may be used by an audio encoder to encode stationary segments of an input audio signal. However, the plurality of sequential blocks used to encode the speech signal (or a speech segment comprised within the input audio signal) may comprise only short blocks. In particular, the blocks of transform coefficients may comprise 256 transform coefficients in 256 frequency bins.

In more general terms, the number of frequency bins or the size of a block may be such that a block of transform coefficients covers in the range of 3 to 7 milliseconds of the speech signal (e.g. 5 ms of the speech signal). The size of the block may be selected such that the speech encoder may operate in sync with video frames encoded by a video encoder. The transform unit may be configured to generate blocks of transform coefficients having a different number of frequency bins. By way of example, the transform unit may be configured to generate blocks having 1920, 960, 480, 240, 120 frequency bins at 48 kHz sampling rate. The block size covering in the range of 3 to 7 ms of the speech signal may be used for the speech encoder. In the above example, the block comprising 240 frequency bins may be used for the speech encoder.

The speech encoder may further comprise an envelope estimation unit configured to determine a current envelope based on the plurality of sequential blocks of transform coefficients. The current envelope may be determined based on the plurality of sequential blocks of the set of blocks. Additional blocks may be taken into account, e.g. blocks of a set of block directly preceding the set of blocks. Alternatively or in addition, so called look-ahead blocks may be taken into account. Overall, this may be beneficial for providing continuity between succeeding sets of blocks. The current envelope may be indicative of a plurality of spectral energy values for the corresponding plurality of frequency bins. In other words, the current envelope may have the same dimension as each block within the plurality of sequential blocks. In yet other words, a single current envelope may be determined for a plurality of (i.e. for more than one) blocks of the speech signal. This is advantageous in order to provide meaningful statistics regarding the spectral data comprised within the plurality of sequential blocks.

The current envelope may be indicative of a plurality of spectral energy values for a corresponding plurality of frequency bands. A frequency band may comprise one or more frequency bins. In particular, one or more of the frequency bands may comprise more than one frequency bin. The number of frequency bins per frequency band may increase with increasing frequency. In other words, the number of frequency bins per frequency band may depend on psychoacoustic considerations. The envelope estimation unit may be configured to determine the spectral energy value for a particular frequency band based on the transform coefficients of the plurality of sequential blocks falling within the particular frequency band. In particular, the envelope estimation unit may be configured to determine the spectral energy value for the particular frequency band based on a root mean squared value of the transform coefficients of the plurality of sequential blocks falling within the particular frequency band. As such, the current envelope may be indicative of an average spectral envelope of the spectral envelopes of the plurality of sequential blocks. Furthermore, the current envelope may have a banded frequency resolution.

The speech encoder may further comprise an envelope interpolation unit configured to determine a plurality of interpolated envelopes for the plurality of sequential blocks of transform coefficients, respectively, based on the current envelope. In particular, the plurality of interpolated envelopes may be determined based on a quantized current envelope, which is also available at a corresponding decoder. By doing this, it is ensured that the plurality of interpolated envelopes may be determined in the same manner at the speech encoder and at the corresponding speech decoder. Hence, the features of the envelope interpolation unit described in the context of the speech decoder are also applicable to the speech encoder, and vice versa. Overall, the envelope interpolation unit may be configured to determine an approximation of the spectral envelope of each of the plurality of sequential bocks (i.e. the interpolated envelope), based on the current envelope.

The speech encoder may further comprise a flattening unit configured to determine a plurality of blocks of flattened transform coefficients by flattening the corresponding plurality of blocks of transform coefficients using the corresponding plurality of interpolated envelopes, respectively. In particular, the interpolated envelope for a particular block (or an envelope derived thereof) may be used to flatten, i.e. to remove the spectral shape of, the transform coefficients comprised within the particular block. It should be noted that this flattening process is different from a whitening operation applied to the particular block of transform coefficients. That is, the flattened transform coefficients cannot be interpreted as the transform coefficients of a time domain whitened signal as typically produced by the LPC (linear predictive coding) analysis of a classical speech encoder. Only the aspect of creating a signal with a relatively flat power spectrum is shared. However, the process of obtaining such a flat power spectrum is different. As will be outlined in the present document, the use of an estimated spectral envelope for flattening the block of transform coefficients is beneficial, because the estimated spectral envelope may be used for bit allocation purposes.

The transform-based speech encoder may further comprise an envelope gain determination unit configured to determine a plurality of envelope gains for the plurality of blocks of transform coefficients, respectively. Furthermore, the transform-based speech encoder may comprise an envelope refinement unit configured to determine a plurality of adjusted envelopes by shifting the plurality of interpolated envelopes in accordance to the plurality of envelope gains, respectively. The envelope gain determination unit may be configured to determine a first envelope gain for a first block of transform coefficients (from the plurality of sequential blocks), such that a variance of the flattened transform coefficients of a corresponding first block of flattened transform coefficients derived using a first adjusted envelope is reduced compared to a variance of the flattened transform coefficients of a corresponding first block of flattened transform coefficients derived using a first interpolated envelope. The first adjusted envelope may be determined by shifting the first interpolated envelope using the first envelope gain. The first interpolated envelope may be the interpolated envelope from the plurality of interpolated envelopes for the first block of transform coefficients from the plurality of blocks of transform coefficients.

In particular, the envelope gain determination unit may be configured to determine the first envelope gain for the first block of transform coefficients, such that the variance of the flattened transform coefficients of the corresponding first block of flattened transform coefficients derived using the first adjusted envelope is one. The flattening unit may be configured to determine the plurality of blocks of flattened transform coefficients by flattening the corresponding plurality of blocks of transform coefficients using the corresponding plurality of adjusted envelopes, respectively. As a result, the blocks of flattened transform coefficients may each have a variance one.

The envelope gain determination unit may be configured to insert gain data indicative of the plurality of envelope gains into the bitstream. As a result, the corresponding decoder is enabled to determine the plurality of adjusted envelopes in the same manner as the encoder.

The speech encoder may be configured to determine the bitstream based on the plurality of blocks of flattened transform coefficients. In particular, the speech encoder may be configured to determine coefficient data based on the plurality of blocks of flattened transform coefficients, wherein the coefficient data is inserted into the bitstream. Example means for determining the coefficient data based on the plurality of blocks of flattened transform coefficients are described below.

The transform-based speech encoder may comprise an envelope quantization unit configured to determine a quantized current envelope by quantizing the current envelope. Furthermore, the envelope quantization unit may be configured to insert envelope data into the bitstream, wherein the envelope data is indicative of the quantized current envelope. As a result, the corresponding decoder may be made aware of the quantized current envelope by decoding the envelope data. The envelope interpolation unit may be configured to determine the plurality of interpolated envelopes, based on the quantized current envelope. By doing this, it may be ensured that the encoder and the decoder are configured to determine the same plurality of interpolated envelopes.

The transform-based speech encoder may be configured to operate in a plurality of different modes. The different modes may comprise a short stride mode and a long stride mode. The framing unit, the envelope estimation unit and the envelope interpolation unit may be configured to process the set of blocks comprising the plurality of sequential blocks of transform coefficients, when the transform-based speech encoder is operated in the short stride mode. Hence, when in the short stride mode, the encoder may be configured to sub-divide a segment/frame of an audio signal into a sequence of sequential blocks, which are processed by the encoder in a sequential manner.

On the other hand, the framing unit, the envelope estimation unit and the envelope interpolation unit may be configured to process a set of blocks comprising only a single block of transform coefficients, when the transform-based speech encoder is operated in the long stride mode. Hence, when in the long stride mode, the encoder may be configured to process a complete segment/frame of the audio signal, without sub-division into blocks. This may be beneficial for short segments/frames of an audio signal, and/or for music signals. When in the long stride mode, the envelope estimation unit may be configured to determine a current envelope of the single block of transform coefficients comprised within the set of blocks. The envelope interpolation unit may be configured to determine an interpolated envelope for the single block of transform coefficients as the current envelope of the single block of transform coefficients. In other words, the envelope interpolation described in the present document may be bypassed, when in the long stride mode, and the current envelope of the single block may be set to be the interpolated envelope (for further processing).

According to another aspect, a transform-based speech decoder configured to decode a bitstream to provide a reconstructed speech signal is described. As already indicated above, the decoder may comprise components which are analogous to the components of corresponding encoder. The decoder may comprise an envelope decoding unit configured to determine a quantized current envelope from the envelope data comprised within the bitstream. As indicated above, the quantized current envelope is typically indicative of a plurality of spectral energy values for a corresponding plurality of frequency bins of frequency bands. Furthermore, the bitstream may comprise data (e.g. the coefficient data) indicative of a plurality of sequential blocks of reconstructed flattened transform coefficients. The plurality of sequential blocks of reconstructed flattened transform coefficients is typically associated with the corresponding plurality of sequential blocks of flattened transform coefficients at the encoder. The plurality of sequential blocks may correspond to the plurality of sequential blocks of a set of blocks, e.g. of the shifted set of blocks described below. A block of reconstructed flattened transform coefficients may comprise a plurality of reconstructed flattened transform coefficients for the corresponding plurality of frequency bins.

The decoder may further comprise an envelope interpolation unit configured to determine a plurality of interpolated envelopes for the plurality of blocks of reconstructed flattened transform coefficients, respectively, based on the quantized current envelope. The envelope interpolation unit of the decoder typically operates in the same manner as the envelope interpolation unit of the encoder. The envelope interpolation unit may be configured to determine the plurality of interpolated envelopes further based on a quantized previous envelope. The quantized previous envelope may be associated with a plurality of previous blocks of reconstructed transform coefficients, directly preceding the plurality of blocks of reconstructed transform coefficients. As such, the quantized previous envelope may have been received by the decoder as envelope data for a previous set of blocks of transform coefficients (e.g. in case of a so-called P-frame). Alternatively or in addition, the envelope data for the set of blocks may be indicative of the quantized previous envelope in addition to being indicative of the quantized current envelope (e.g. in case of a so-called I-frame). This enables the I-frame to be decoded without knowledge of previous data.

The envelope interpolation unit may be configured to determine a spectral energy value for a particular frequency bin of a first interpolated envelope by interpolating the spectral energy values for the particular frequency bin of the quantized current envelope and of the quantized previous envelope at a first intermediate time instant. The first interpolated envelope is associated with or corresponds to a first block of the plurality of sequential blocks of reconstructed flattened transform coefficients. As outlined above, the quantized previous and current envelopes are typically banded envelopes. The spectral energy values for a particular frequency band are typically constant for all frequency bins comprised within the frequency band.

The envelope interpolation unit may be configured to determine the spectral energy value for the particular frequency bin of the first interpolated envelope by quantizing the interpolation between the spectral energy values for the particular frequency bin of the quantized current envelope and of the quantized previous envelope. As such, the plurality of interpolated envelopes may be quantized interpolated envelopes.

The envelope interpolation unit may be configured to determine a spectral energy value for the particular frequency bin of a second interpolated envelope by interpolating the spectral energy values for the particular frequency bin of the quantized current envelope and of the quantized previous envelope at a second intermediate time instant. The second interpolated envelope may be associated with or may correspond to a second block of the plurality of blocks of reconstructed flattened transform coefficients. The second block of reconstructed flattened transform coefficients may be subsequent to the first block of reconstructed flattened transform coefficients and the second intermediate time instant may be subsequent to the first intermediate time instant. In particular, a difference between the second intermediate time instant and the first intermediate time instant may correspond to a time interval between the second block of reconstructed flattened transform coefficients and the first block of reconstructed flattened transform coefficients.

The envelope interpolation unit may be configured to perform one or more of: a linear interpolation, a geometric interpolation, and a harmonic interpolation. Furthermore, the envelope interpolation unit may be configured to perform the interpolation in a logarithm domain.

Furthermore, the decoder may comprise an inverse flattening unit configured to determine a plurality of blocks of reconstructed transform coefficients by providing the corresponding plurality of blocks of reconstructed flattened transform coefficients with a spectral shape, using the corresponding plurality of interpolated envelopes, respectively.

As indicated above, the bitstream may be indicative of a plurality of envelope gains (within the gain data) for the plurality of blocks of reconstructed flattened transform coefficients, respectively. The transform-based speech decoder may further comprise an envelope refinement unit configured to determine a plurality of adjusted envelopes by applying the plurality of envelope gains to the plurality of interpolated envelopes, respectively. The inverse flattening unit may be configured to determine the plurality of blocks of reconstructed transform coefficients by providing the corresponding plurality of blocks of reconstructed flattened transform coefficients with a spectral shape, using the corresponding plurality of adjusted envelopes, respectively.

The decoder may be configured to determine the reconstructed speech signal based on the plurality of blocks of reconstructed transform coefficients.

According to another aspect, a transform-based speech encoder configured to encode a speech signal into a bitstream is described. The encoder may comprise any of the encoder related features and/or components described in the present document. In particular, the encoder may comprise a framing unit configured to receive a plurality of sequential blocks of transform coefficients. The plurality of sequential blocks comprises a current block and one or more previous blocks. As indicated above, the plurality of sequential blocks is indicative of samples of the speech signal.

Furthermore, the encoder may comprise a flattening unit configured to determine a current block and one or more previous blocks of flattened transform coefficients by flattening the corresponding current block and the one or more previous blocks of transform coefficients using a corresponding current block envelope and corresponding one or more previous block envelopes, respectively. The block envelopes may correspond to the above mentioned adjusted envelopes.

In addition, the encoder comprises a predictor configured to determine a current block of estimated flattened transform coefficients based on one or more previous blocks of reconstructed transform coefficients and based on one or more predictor parameters. The one or more previous blocks of reconstructed transform coefficients may have been derived from the one or more previous blocks of flattened transform coefficients, respectively (e.g. using the predictor).

The predictor may comprise an extractor configured to determine a current block of estimated transform coefficients based on the one or more previous blocks of reconstructed transform coefficients and based on the one or more predictor parameters. As such, the extractor may operate in the un-flattened domain (i.e. the extractor may operate on blocks of transform coefficients having a spectral shape). This may be beneficial with regards to a signal model used by the extractor for determining the current block of estimated transform coefficients.

Furthermore, the predictor may comprise a spectral shaper configured to determine the current block of estimated flattened transform coefficients based on the current block of estimated transform coefficients, based on at least one of the one or more previous block envelopes and based on at least one of the one or more predictor parameters. As such, the spectral shaper may be configured to convert the current block of estimated transform coefficients into the flattened domain to provide the current block of estimated flattened transform coefficients. As outlined in the context of the corresponding decoder, the spectral shaper may make use of the plurality of adjusted envelopes (or the plurality of block envelopes) for this purpose.

As indicated above, the predictor (in particular, the extractor) may comprise a model-based predictor using a signal model. The signal model may comprise one or more model parameters, and the one or more predictor parameters may be indicative of the one or more model parameters. The use of a model-based predictor may be beneficial for providing bit-rate efficient means for describing the prediction coefficients used by the subband (or frequency bin)-predictor. In particular, it may be possible to determine a complete set of prediction coefficients using only a few model parameters, which may be transmitted as predictor data to the corresponding decoder in a bit-rate efficient manner.

As such, the model-based predictor may be configured to determine the one or more model parameters of the signal model (e.g. using a Durbin-Levinson algorithm). Furthermore, the model-based predictor may be configured to determine a prediction coefficient to be applied to a first reconstructed transform coefficient in a first frequency bin of a previous block of reconstructed transform coefficients, based on the signal model and based on the one or more model parameters. In particular, a plurality of prediction coefficients for a plurality of reconstructed transform coefficients may be determined. By doing this, an estimate of a first estimated transform coefficient in the first frequency bin of the current block of estimated transform coefficients may be determined by applying the prediction coefficient to the first reconstructed transform coefficient. In particular, by doing this, the estimated transform coefficients of the current block of estimated transform coefficients may be determined.

By way of example, the signal model may comprise one or more sinusoidal model components and the one or more model parameters may be indicative of a frequency of the one or more sinusoidal model components. In particular, the one or more model parameters may be indicative of a fundamental frequency of a multi-sinusoidal signal model. Such a fundamental frequency may correspond to a delay in the time domain.

The predictor may be configured to determine the one or more predictor parameters such that a mean square value of the prediction error coefficients of the current block of prediction error coefficients is reduced (e.g. minimized). This may be achieved using e.g. a Durbin-Levinson algorithm. The predictor may be configured to insert predictor data indicative of the one or more predictor parameters into the bitstream. As a result, the corresponding decoder is enabled to determine the current block of estimated flattened transform coefficients in the same manner as the encoder.

Furthermore, the encoder may comprise a difference unit configured to determine a current block of prediction error coefficients based on the current block of flattened transform coefficients and based on the current block of estimated flattened transform coefficients. The bitstream may be determined based on the current block of prediction error coefficients. In particular, the coefficient data of the bitstream may be indicative of the current block of prediction error coefficients.

According to a further aspect, a transform-based speech decoder configured to decode a bitstream to provide a reconstructed speech signal is described. The decoder may comprise any of the decoder related features and/or components described in the present document. In particular, the decoder may comprise a predictor configured to determine a current block of estimated flattened transform coefficients based on one or more previous blocks of reconstructed transform coefficients and based on one or more predictor parameters derived from (the predictor data of) the bitstream. As outlined in the context of the corresponding encoder, the predictor may comprise an extractor configured to determine a current block of estimated transform coefficients based on at least one of the one or more previous blocks of reconstructed transform coefficients and based on at least one of the one or more predictor parameters. Furthermore, the predictor may comprise a spectral shaper configured to determine the current block of estimated flattened transform coefficients based on the current block of estimated transform coefficients, based on one or more previous block envelopes (e.g. the previous adjusted envelopes) and based on the one or more predictor parameters.

The one or more predictor parameters may comprise a block lag parameter T. The block lag parameter may be indicative of a number of blocks preceding the current block of estimated flattened transform coefficients. In particular, the block lag parameter T may be indicative of a periodicity of the speech signal. As such, the block lag parameter T may indicate which one or more of the previous blocks of reconstructed transform coefficients are (most) similar to the current block of transform coefficients, and may therefore be used to predict the current block of transform coefficients, i.e. may be used to determine the current block of estimated transform coefficients.

The spectral shaper may be configured to flatten the current block of estimated transform coefficients using a current estimated envelope. Furthermore, the spectral shaper may be configured to determine the current estimated envelope based on at least one of the one or more previous block envelopes and based on the block lag parameter. In particular, the spectral shaper may be configured to determine an integer lag value based on the block lag parameter. The integer lag value may be determined by rounding the block lag parameter to the closest integer. Furthermore, the spectral shaper may be configured to determine the current estimated envelope as the previous block envelope (e.g. the previous adjusted envelope) of the previous block of reconstructed transform coefficients preceding the current block of estimated flattened transform coefficients by a number of blocks corresponding to the integer lag value. It should be noted that the features described for the spectral shaper of the decoder are also applicable to the spectral shaper of the encoder.

The extractor may be configured to determine a current block of estimated transform coefficients based on at least one of the one or more previous blocks of reconstructed transform coefficients and based on the block lag parameter. For this purpose, the extractor may make use of a model-based predictor, as outlined in the context of the corresponding encoder. In this context, the block lag parameter may be indicative of a fundamental frequency of a multi-sinusoidal model.

Furthermore, the speech decoder may comprise a spectrum decoder configured to determine a current block of quantized prediction error coefficients based on coefficient data comprised within the bitstream. For this purpose, the spectrum decoder may make use of inverse quantizers as described in the present document. In addition, the speech decoder may comprise an adding unit configured to determine a current block of reconstructed flattened transform coefficients based on the current block of estimated flattened transform coefficients and based on the current block of quantized prediction error coefficients. In addition, the speech decoder may comprise an inverse flattening unit configured to determine a current block of reconstructed transform coefficients by providing the current block of reconstructed flattened transform coefficients with a spectral shape, using a current block envelope. Furthermore, the flattening unit may be configured to determine the one or more previous blocks of reconstructed transform coefficients by providing one or more previous blocks of reconstructed flattened transform coefficients with a spectral shape, using the one or more previous block envelopes (e.g. the previous adjusted envelopes), respectively. The speech decoder may be configured to determine the reconstructed speech signal based on the current and on the one or more previous blocks of reconstructed transform coefficients.

The transform-based speech decoder may comprise an envelope buffer configured to store one or more previous block envelopes. The spectral shaper may be configured to determine the integer lag value $T_0$ by limiting the integer lag value $T_0$ to a number of previous block envelopes stored within the envelope buffer. The number of previous block envelopes which are stored within the envelope buffer may vary (e.g. at the beginning of an I-frame). The spectral shaper may be configured to determine the number of previous envelopes which are stored in the envelope buffer and limit the integer lag value $T_0$ accordingly. By doing this, erroneous envelope loop-ups may be avoided.

The spectral shaper may be configured to flatten the current block of estimated transform coefficients, such that, prior to application of the one or more predictor parameters (notably prior to application of the predictor gain), the current block of flattened estimated transform coefficients exhibits unit variance (e.g. in some or all of the frequency bands). For this purpose, the bitstream may comprise a variance gain parameter and the spectral shaper may be configured to apply the variance gain parameter to the current block of estimated transform coefficients. This may be beneficial with regards to the quality of prediction.

According to a further aspect, a transform-based speech encoder configured to encode a speech signal into a bitstream is described. As already indicated above, the encoder may comprise any of the encoder related features and/or components described in the present document. In particular, the encoder may comprise a framing unit configured to receive a plurality of sequential blocks of transform coefficients. The plurality of sequential blocks comprises a current block and one or more previous blocks. Furthermore, the plurality of sequential blocks is indicative of samples of the speech signal.

In addition, the speech encoder may comprise a flattening unit configured to determine a current block of flattened transform coefficients by flattening the corresponding current block of transform coefficients using a corresponding current block envelope (e.g. the corresponding adjusted envelope). Furthermore, the speech encoder may comprise a predictor configured to determine a current block of estimated flattened transform coefficients based on one or more previous blocks of reconstructed transform coefficients and based on one or more predictor parameters (comprising e.g. a predictor gain). As outlined above, the one or more previous blocks of reconstructed transform coefficients may have been derived from the one or more previous blocks of transform coefficients. In addition, the speech encoder may comprise a difference unit configured to determine a current block of prediction error coefficients based on the current block of flattened transform coefficients and based on the current block of estimated flattened transform coefficients.

The predictor may be configured to determine the current block of estimated flattened transform coefficients using a weighted mean squared error criterion (e.g. by minimizing a weighted mean squared error criterion). The weighted mean squared error criterion may take into account the current block envelope or some predefined function of the current block envelope as weights. In the present document, various different ways for determining the predictor gain using a weighted means squared error criterion are described.

Furthermore, the speech encoder may comprise a coefficient quantization unit configured to quantize coefficients derived from the current block of prediction error coefficients, using a set of pre-determined quantizers. The coefficient quantization unit may be configured to determine the set of pre-determined quantizers in dependence of at least one of the one or more predictor parameters. This means that the performance of the predictor may have an impact on the quantizers used by the coefficient quantization unit. The coefficient quantization unit may be configured to determine coefficient data for the bitstream based on the quantized coefficients. As such, the coefficient data may be indicative of a quantized version of the current block of prediction error coefficients.

The transform-based speech encoder may further comprise a scaling unit configured to determine a current block of rescaled error coefficients based on the current block of prediction error coefficients using one or more scaling rules. The current block of rescaled error coefficient may be determined such and/or the one or more scaling rules may be such that in average a variance of the rescaled error coefficients of the current block of rescaled error coefficients is higher than a variance of the prediction error coefficients of the current block of prediction error coefficients. In particular, the one or more scaling rules may be such that the variance of the prediction error coefficients is closer to unity for all frequency bins or frequency bands. The coefficient quantization unit may be configured to quantize the rescaled error coefficients of the current block of rescaled error coefficients, to provide the coefficient data.

The current block of prediction error coefficients typically comprises a plurality of prediction error coefficients for the corresponding plurality of frequency bins. The scaling gains which are applied by the scaling unit to the prediction error coefficients in accordance to the scaling rule may be dependent on the frequency bins of the respective prediction error coefficients. Furthermore, the scaling rule may be dependent on the one or more predictor parameters, e.g. on the predictor gain. Alternatively or in addition, the scaling rule may be dependent on the current block envelope. In the present document, various different ways for determining a frequency bin—dependent scaling rule are described.

The transform-based speech encoder may further comprise a bit allocation unit configured to determine an allocation vector based on the current block envelope. The allocation vector may be indicative of a first quantizer from the set of pre-determined quantizers to be used to quantize a first coefficient derived from the current block of prediction error coefficients. In particular, the allocation vector may be indicative of quantizers to be used for quantizing all of the coefficients derived from the current block of prediction error coefficients, respectively. By way of example, the allocation vector may be indicative of a different quantizer to be used for each frequency band.

The bit allocation unit may be configured to determine the allocation vector such that the coefficient data for the current block of prediction error coefficients does not exceed a pre-determined number of bits. Furthermore, the bit allocation unit may be configured to determine an offset value indicative of an offset to be applied to an allocation envelope derived from the current block envelope (e.g. derived from the current adjusted envelope). The offset value may be included into the bitstream to enable the corresponding decoder to identify the quantizers which have been used to determine the coefficient data. According to another aspect, a transform-based speech decoder configured to decode a bitstream to provide a reconstructed speech signal is described. The speech decoder may comprise any of the features and/or components described in the present document. In particular, the decoder may comprise a predictor configured to determine a current block of estimated flattened transform coefficients based on one or more previous blocks of reconstructed transform coefficients and based on one or more predictor parameters derived from the bitstream. Furthermore, the speech decoder may comprise a spectrum decoder configured to determine a current block of quantized prediction error coefficients (or a rescaled version thereof) based on coefficient data comprised within the bitstream, using a set of pre-determined quantizers. In particular, the spectrum decoder may make use of a set of pre-determined inverse quantizers corresponding to the set of pre-determined quantizers used by the corresponding speech encoder.

The spectrum decoder may be configured to determine the set of pre-determined quantizers (and/or the corresponding set of pre-determined inverse quantizers) in dependence of the one or more predictor parameters. In particular, the spectrum decoder may perform the same selection process for the set of pre-determined quantizers as the coefficient quantization unit of the corresponding speech encoder. By making the set of pre-determined quantizers dependent on the one or more predictor parameters, the perceptual quality of the reconstructed speech signal may be improved.

The set of pre-determined quantizers may comprise different quantizers with different signal to noise ratios (and different associated bit-rates). Furthermore, the set of pre-determined quantizers may comprise at least one dithered quantizer. The one or more predictor parameters may comprise a predictor gain g. The predictor gain g may be indicative of a degree of relevance of the one or more previous blocks of reconstructed transform coefficients for the current block of reconstructed transform coefficients. As such, the predictor gain g may provide an indication of the amount of information comprised within the current block of prediction error coefficients. A relatively high predictor gain g may be indicative of a relative low amount of information, and vice versa. A number of dithered quantizers comprised within the set of pre-determined quantizers may depend on the predictor gain. In particular, the number of dithered quantizers comprised within the set of pre-determined quantizers may decrease with increasing predictor gain.

The spectrum decoder may have access to a first set and a second set of pre-determined quantizers. The second set may comprise a lower number of dithered quantizers than the first set of quantizers. The spectrum decoder may be configured to determine a set criterion rfu based on the predictor gain g. The spectrum decoder may be configured to use the first set of pre-determined quantizers if the set criterion rfu is smaller than a pre-determined threshold. Furthermore, the spectrum decoder may be configured to use the second set of pre-determined quantizers if the set criterion rfu is greater than or equal to the pre-determined threshold. The set criterion may be rfu=min(1, max(g, 0)), where the predictor gain is g. This set criterion rfu takes on values greater than or equal to zero and smaller than or equal to one. The pre-determined threshold may be 0.75.

As indicated above, the set criterion may depend on the predetermined control parameter, rfu. In an alternative example, the control parameter rfu may be determined using the following conditions: rfu=1.0 for $g<-1.0$; rfu=−g for $-1.0\leq g<0.0$; rfu=g for $0.0\leq g<1.0$; rfu=2.0−g for $1.0\leq g<2.0$; and/or rfu=0.0 for $g\geq 2.0$.

Furthermore, the speech decoder may comprise an adding unit configured to determine a current block of reconstructed flattened transform coefficients based on the current block of estimated flattened transform coefficients and based on the current block of quantized prediction error coefficients. Furthermore, the speech decoder may comprise an inverse flattening unit configured to determine a current block of reconstructed transform coefficients by providing the current block of reconstructed flattened transform coefficients with a spectral shape, using a current block envelope. The reconstructed speech signal may be determined based on the current block of reconstructed transform coefficients (e.g. using an inverse transform unit).

The transform-based speech decoder may comprise an inverse rescaling unit configured to rescale the quantized prediction error coefficients of the current block of quantized prediction error coefficients using an inverse scaling rule, to provide a current block of rescaled prediction error coefficients. Scaling gains which are applied by the inverse scaling unit to the quantized prediction error coefficients in accordance to the inverse scaling rule may be dependent on frequency bins of the respective quantized prediction error coefficients. In other words, the inverse scaling rule may be frequency-dependent, i.e. the scaling gains may dependent on the frequency. The inverse scaling rule may be configured to adjust the variance of the quantized prediction error coefficients for the different frequency bins.

The inverse scaling rule is typically the inverse of the scaling rule applied by the scaling unit of the corresponding transform-based speech encoder. Hence, the aspects, which are described herein with regards to the determination and the properties of the scaling rule, are also applicable (in an analogous manner) for the inverse scaling rule.

The adding unit may then be configured to determine the current block of reconstructed flattened transform coefficients by adding the current block of rescaled prediction error coefficients to the current block of estimated flattened transform coefficients.

The one or more control parameters may comprise a variance preservation flag. The variance preservation flag may be indicative of how a variance of the current block of quantized prediction error coefficients is to be shaped. In other words, the variance preservation flag may be indicative of processing to be performed by the decoder, which has an impact on the variance of the current block of quantized prediction error coefficients.

By way of example, the set of pre-determined quantizers may be determined in dependence of the variance preservation flag. In particular, the set of pre-determined quantizers may comprise a noise synthesis quantizer. A noise gain of the noise synthesis quantizer may be dependent on the variance preservation flag. Alternatively or in addition, the set of pre-determined quantizers comprises one or more dithered quantizers covering an SNR range. The SNR range may be determined in dependence on the variance preservation flag. At least one of the one or more dithered quantizer may be configured to apply a post-gain $\gamma$, when determining a quantized prediction error coefficient. The post-gain $\gamma$ may be dependent on the variance preservation flag.

The transform-based speech decoder may comprises an inverse rescaling unit configured to rescale the quantized prediction error coefficients of the current block of quantized prediction error coefficients, to provide a current block of rescaled prediction error coefficients. The adding unit may be configured to determine the current block of reconstructed flattened transform coefficients either by adding the current block of rescaled prediction error coefficients or by adding the current block of quantized prediction error coefficients to the current block of estimated flattened transform coefficients, depending on the variance preservation flag.

The variance preservation flag may be used to adapt the degree of noisiness of the quantizers to the quality of the prediction. As a result of this, the perceptual quality of the codec may be improved.

According to another aspect, a transform-based audio encoder is described. The audio encoder is configured to encode an audio signal comprising a first segment (e.g. a speech segment) into a bitstream. In particular, the audio encoder may be configured to encode one or more speech segments of the audio signal using a transform-based speech encoder. Furthermore, the audio encoder may be configured to encode one or more non-speech segments of the audio signal using a generic transform-based audio encoder.

The audio encoder may comprise a signal classifier configured to identify the first segment (e.g. the speech segment) from the audio signal. In more general terms, the signal classifier may be configured to determine a segment from the audio signal which is to be encoded by a transform-based speech encoder. The determined first segment may be referred to as a speech segment (even though the segment may not necessarily comprise actual speech). In particular, the signal classifier may be configured to classify different segments (e.g. frames or blocks) of the audio signal into speech or non-speech. As outlined above, a block of transform coefficients may comprise a plurality of transform coefficients for a corresponding plurality of frequency bins.

Furthermore, the audio encoder may comprise a transform unit configured to determine a plurality of sequential blocks of transform coefficients based on the first segment. The transform unit may be configured to transform speech segments and non-speech segments.

The transform unit may be configured to determine long blocks comprising a first number of transform coefficients and short blocks comprising a second number of transform coefficients. The first number of samples may be greater than the second number of samples. In particular, the first number of samples may be 1024 and the second number of samples may be 256. The blocks of the plurality of sequential blocks may be short blocks. In particular, the audio encoder may be configured to transform all segments of the audio signal, which have been classified to be speech, into short blocks.

Furthermore, the audio encoder may comprise a transform-based speech encoder (as described in the present document) configured to encode the plurality of sequential blocks into the bitstream. In addition, the audio encoder may comprise a generic transform-based audio encoder configured to encode a segment of the audio signal other than the first segment (e.g. a non-speech segment). The generic transform-based audio encoder may be an AAC (Advanced Audio Coder) or an HE (High Efficiency)-AAC encoder. As already outlined above, the transform unit may be configured to perform an MDCT. As such, the audio encoder may be configured to encode the complete input audio signal (comprising speech segments and non-speech segments) in the transform domain (using a single transform unit).

According to another aspect, a corresponding transform-based audio decoder configured to decode a bitstream indicative of an audio signal comprising a speech segment (i.e. a segment which has been encoded using a transform-based speech encoder) is described. The audio decoder may comprise a transform-based speech decoder configured to determine a plurality of sequential blocks of reconstructed transform coefficients based on data (e.g. the envelope data, the gain data, the predictor data and the coefficient data) comprised within the bitstream. Furthermore, the bitstream may indicate that the received data is to be decoded using a speech decoder.

In addition, the audio decoder may comprise an inverse transform unit configured to determine a reconstructed speech segment based on the plurality of sequential blocks of reconstructed transform coefficients. A block of reconstructed transform coefficients may comprise a plurality of reconstructed transform coefficients for a corresponding plurality of frequency bins. The inverse transform unit may be configured to process long blocks comprising a first number of reconstructed transform coefficients and short blocks comprising a second number of reconstructed transform coefficients. The first number of samples may be greater than the second number of samples. The blocks of the plurality of sequential blocks may be short blocks.

According to a further aspect, a method for encoding a speech signal into a bitstream is described. The method may comprise receiving a set of blocks. The set of blocks may comprise a plurality of sequential blocks of transform coefficients. The plurality of sequential blocks may be indicative of samples of the speech signal. Furthermore, a block of transform coefficients may comprise a plurality of transform coefficients for a corresponding plurality of frequency bins. The method may proceed in determining a current envelope based on the plurality of sequential blocks of transform coefficients. The current envelope may be indicative of a plurality of spectral energy values for the corresponding plurality of frequency bins. Furthermore, the method may comprise determining a plurality of interpolated envelopes for the plurality of blocks of transform coefficients, respectively, based on the current envelope. In addition, the method may comprise determining a plurality of blocks of flattened transform coefficients by flattening the corresponding plurality of blocks of transform coefficients using the corresponding plurality of interpolated envelopes, respectively. The bitstream may be determined based on the plurality of blocks of flattened transform coefficients.

According to another aspect, a method for decoding a bitstream to provide a reconstructed speech signal is described. The method may comprise determining a quantized current envelope from envelope data comprised within the bitstream. The quantized current envelope may be indicative of a plurality of spectral energy values for a corresponding plurality of frequency bins. The bitstream may comprise data (e.g. the coefficient data and/or predictor data) indicative of a plurality of sequential blocks of reconstructed flattened transform coefficients. A block of reconstructed flattened transform coefficients may comprise a plurality of reconstructed flattened transform coefficients for the corresponding plurality of frequency bins. Furthermore, the method may comprise determining a plurality of interpolated envelopes for the plurality of blocks of reconstructed flattened transform coefficients, respectively, based on the quantized current envelope. The method may proceed in determining a plurality of blocks of reconstructed transform coefficients by providing the corresponding plurality of blocks of reconstructed flattened transform coefficients with a spectral shape, using the corresponding plurality of interpolated envelopes, respectively. The reconstructed speech signal may be based on the plurality of blocks of reconstructed transform coefficients.

According to another aspect, a method for encoding a speech signal into a bitstream is described. The method may comprise receiving a plurality of sequential blocks of transform coefficients comprising a current block and one or more previous blocks. The plurality of sequential blocks may be indicative of samples of the speech signal. The method may proceed in determining a current block and one or more previous blocks of flattened transform coefficients by flattening the corresponding current block and the corresponding one or more previous blocks of transform coefficients using a corresponding current block envelope and corresponding one or more previous block envelopes, respectively.

Furthermore, the method may comprise determining a current block of estimated flattened transform coefficients based on one or more previous blocks of reconstructed transform coefficients and based on a predictor parameter. This may be achieved using prediction techniques. The one or more previous blocks of reconstructed transform coefficients may have been derived from the one or more previous blocks of flattened transform coefficients, respectively. The step of determining the current block of estimated flattened transform coefficients may comprise determining a current block of estimated transform coefficients based on the one or more previous blocks of reconstructed transform coefficients and based on the predictor parameter, and determining the current block of estimated flattened transform coefficients based on the current block of estimated transform coefficients, based on the one or more previous block envelopes and based on the predictor parameter.

Furthermore, the method may comprise determining a current block of prediction error coefficients based on the current block of flattened transform coefficients and based on the current block of estimated flattened transform coefficients. The bitstream may be determined based on the current block of prediction error coefficients.

According to a further aspect, a method for decoding a bitstream to provide a reconstructed speech signal is described. The method may comprise determining a current block of estimated flattened transform coefficients based on one or more previous blocks of reconstructed transform coefficients and based on a predictor parameter derived from the bitstream. The step of determining the current block of estimated flattened transform coefficients may comprise determining a current block of estimated transform coefficients based on the one or more previous blocks of reconstructed transform coefficients and based on the predictor parameter; and determining the current block of estimated flattened transform coefficients based on the current block of estimated transform coefficients, based on one or more previous block envelopes and based on the predictor parameter.

Furthermore, the method may comprise determining a current block of quantized prediction error coefficients based on coefficient data comprised within the bitstream. The method may proceed in determining a current block of reconstructed flattened transform coefficients based on the current block of estimated flattened transform coefficients and based on the current block of quantized prediction error coefficients. A current block of reconstructed transform coefficients may be determined by providing the current block of reconstructed flattened transform coefficients with a spectral shape, using a current block envelope (e.g. the current adjusted envelope). Furthermore, the one or more previous blocks of reconstructed transform coefficients may be determined by providing one or more previous blocks of reconstructed flattened transform coefficients with a spectral shape, using the one or more previous block envelopes (e.g. the one or more previous adjusted envelopes), respectively. In addition, the method may comprise determining the reconstructed speech signal based on the current and the one or more previous blocks of reconstructed transform coefficients.

According to a further aspect, a method for encoding a speech signal into a bitstream is described. The method may comprise receiving a plurality of sequential blocks of transform coefficients comprising a current block and one or more previous blocks. The plurality of sequential blocks may be indicative of samples of the speech signal. Furthermore, the method may comprise determining a current block of estimated transform coefficients based on one or more previous blocks of reconstructed transform coefficients and based on a predictor parameter. The one or more previous blocks of reconstructed transform coefficients may have been derived from the one or more previous blocks of transform coefficients. The method may proceed in determining a current block of prediction error coefficients based on the current block of transform coefficients and based on the current block of estimated transform coefficients. Furthermore, the method may comprise quantizing coefficients derived from the current block of prediction error coefficients, using a set of pre-determined quantizers. The set of pre-determined quantizers may be dependent on the predictor parameter. Furthermore, the method may comprise determining coefficient data for the bitstream based on the quantized coefficients.

According to another aspect, a method for decoding a bitstream to provide a reconstructed speech signal is described. The method may comprise determining a current block of estimated transform coefficients based on one or more previous blocks of reconstructed transform coefficients and based on a predictor parameter derived from the bitstream. Furthermore, the method may comprise determining a current block of quantized prediction error coefficients based on coefficient data comprised within the bitstream, using a set of pre-determined quantizers. The set of pre-determined quantizers may be a function of the predictor parameter. The method may proceed in determining a current block of reconstructed transform coefficients based on the current block of estimated transform coefficients and based on the current block of quantized prediction error coefficients. The reconstructed speech signal may be determined based on the current block of reconstructed transform coefficients.

According to further aspect, a method for encoding an audio signal comprising a speech segment into a bitstream is described. The method may comprise identifying the speech segment from the audio signal. Furthermore, the method may comprise determining a plurality of sequential blocks of transform coefficients based on the speech segment, using a transform unit. The transform unit may be configured to determine long blocks comprising a first number of transform coefficients and short blocks comprising a second number of transform coefficients. The first number may be greater than the second number. The blocks of the plurality of sequential blocks may be short blocks. In addition, the method may comprise encoding the plurality of sequential blocks into the bitstream.

According to another aspect, a method for decoding a bitstream indicative of an audio signal comprising a speech segment is described. The method may comprise determining a plurality of sequential blocks of reconstructed transform coefficients based on data comprised within the bitstream. Furthermore, the method may comprise determining a reconstructed speech segment based on the plurality of sequential blocks of reconstructed transform coefficients, using an inverse transform unit. The inverse transform unit may be configured to process long blocks comprising a first number of reconstructed transform coefficients and short blocks comprising a second number of reconstructed transform coefficients. The first number may be greater than the second number. The blocks of the plurality of sequential blocks may be short blocks.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be combined in various ways. In particular, the features of the claims may be combined with one another in an arbitrary manner.

SHORT DESCRIPTION OF THE FIGURES

Figure 1B:
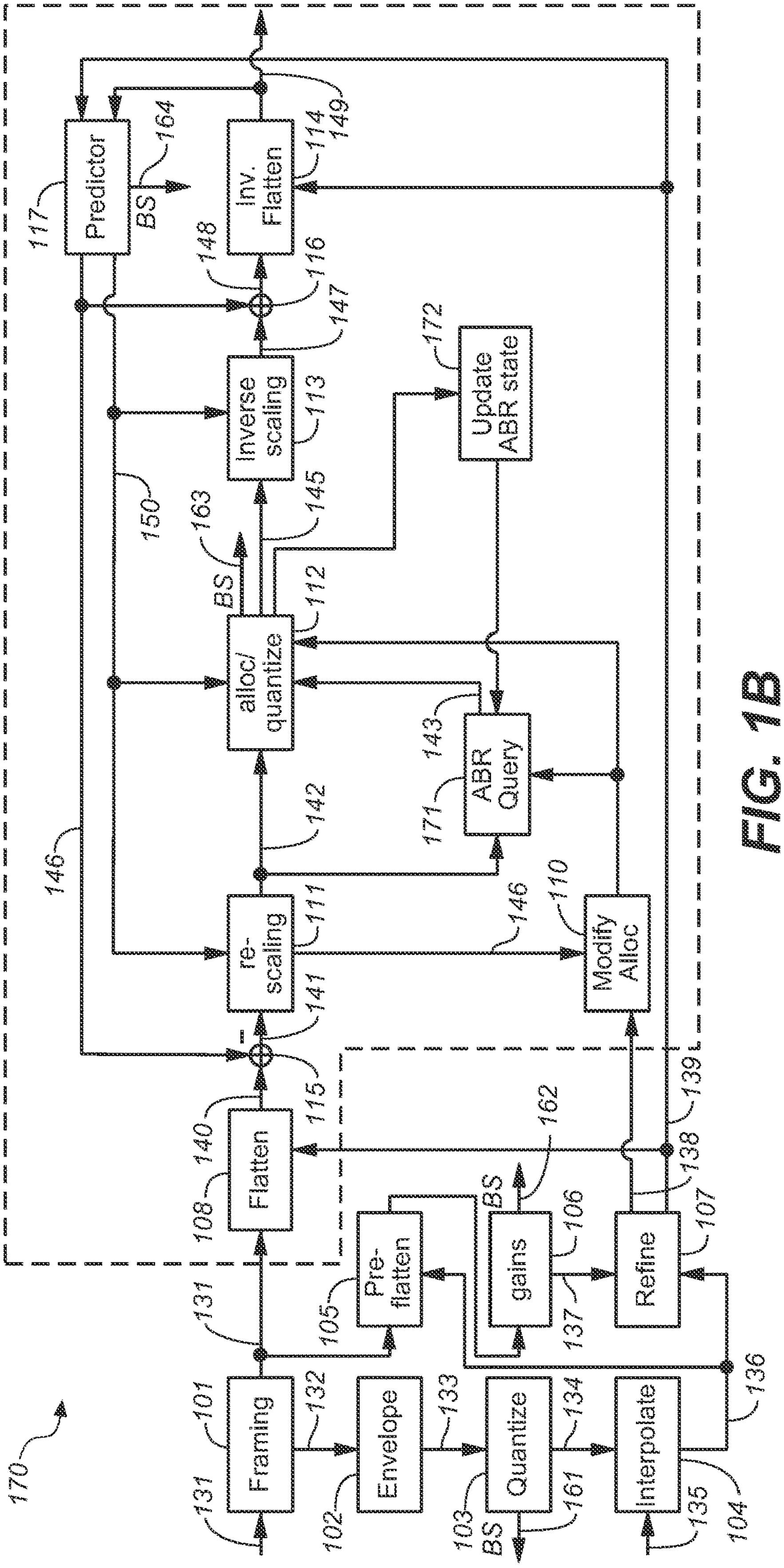
Figure 2:
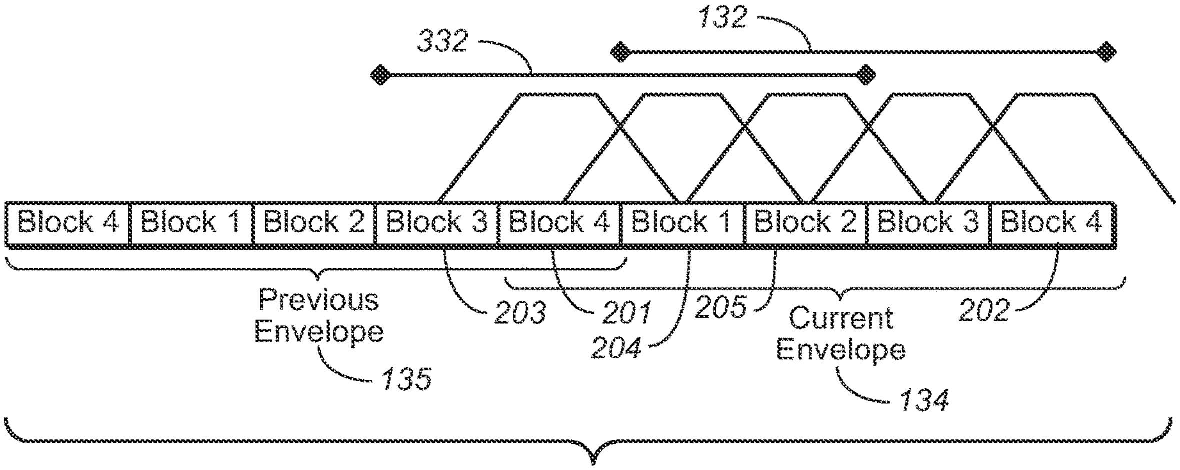
Figure 3A:
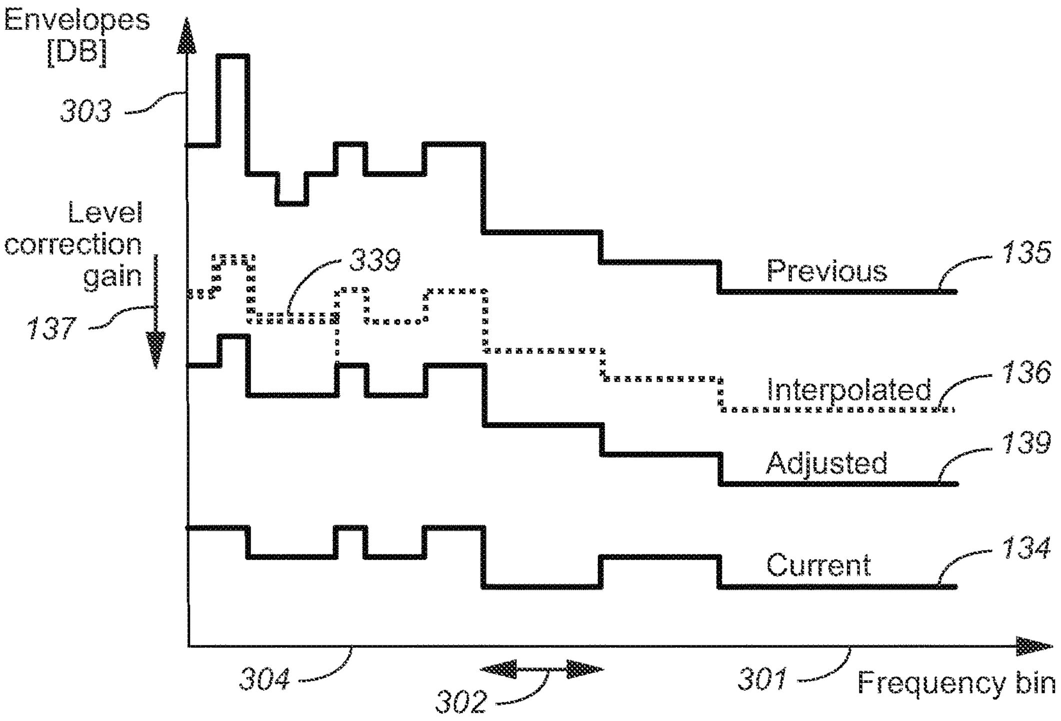
Figure 3B:
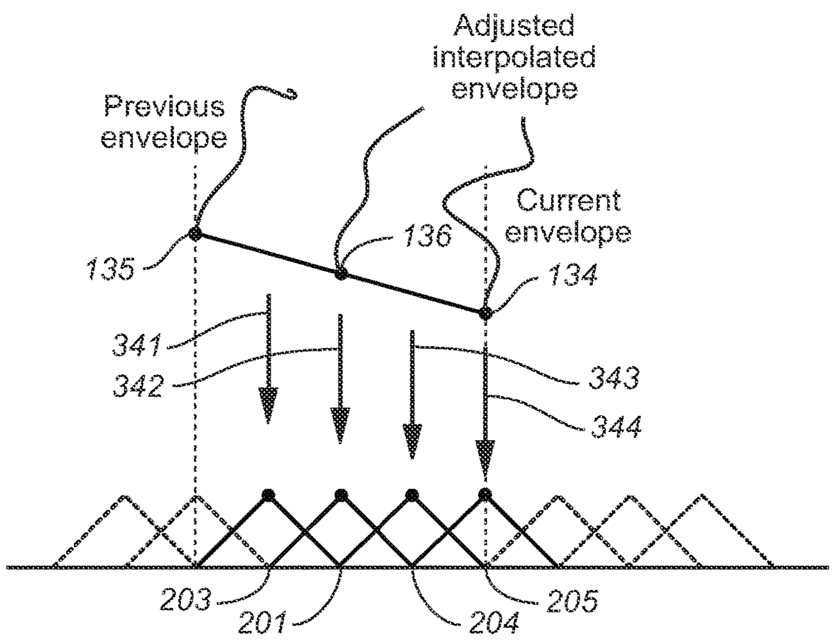
Figure 4:
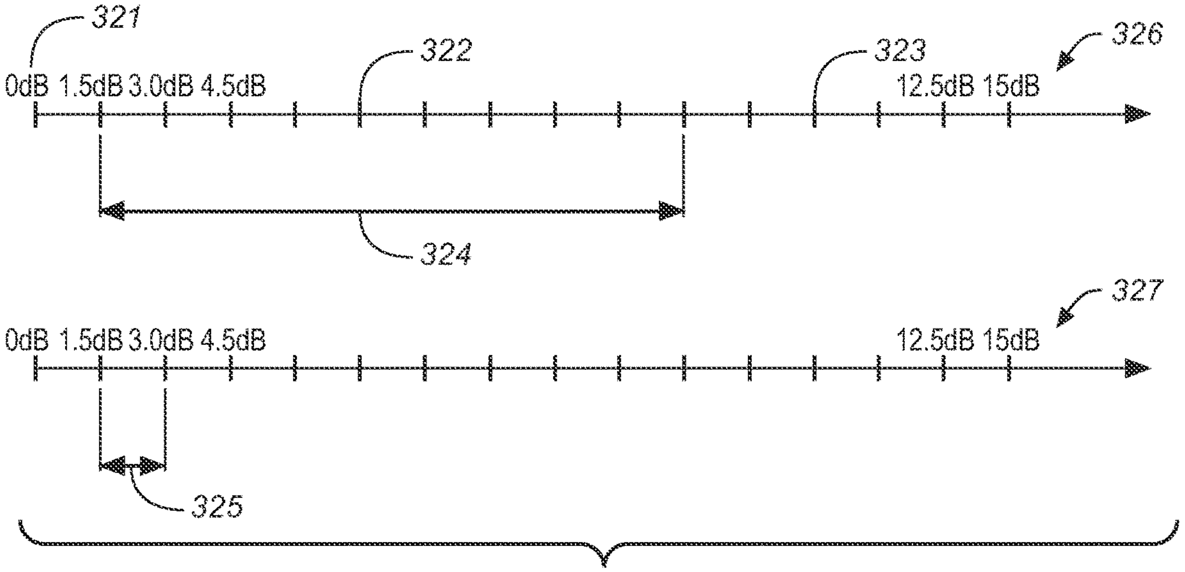
Figure 5A:
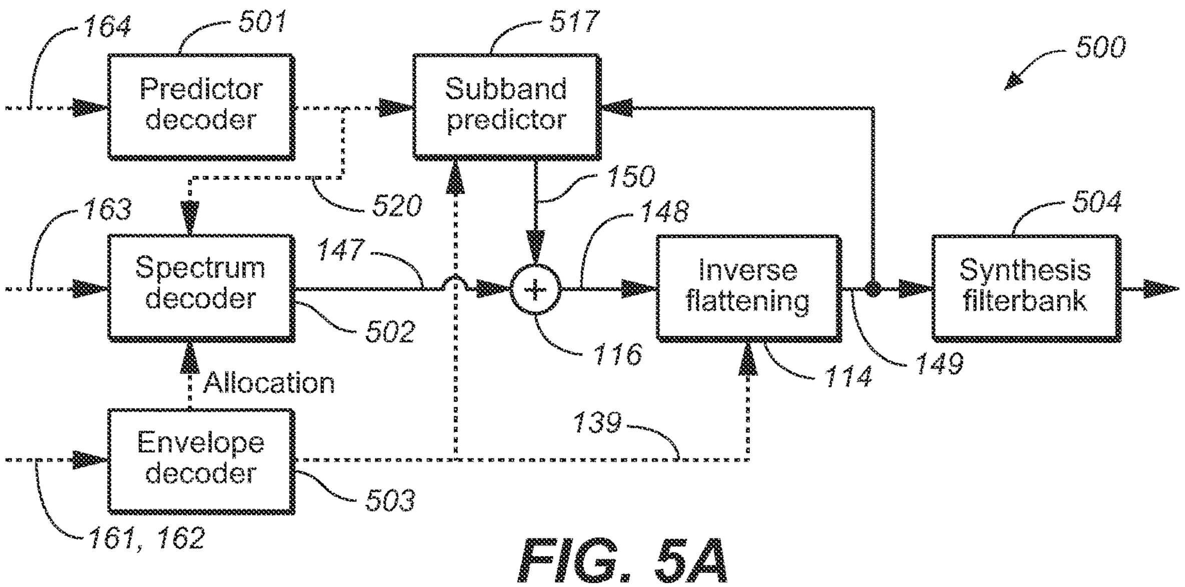
Figure 5B:
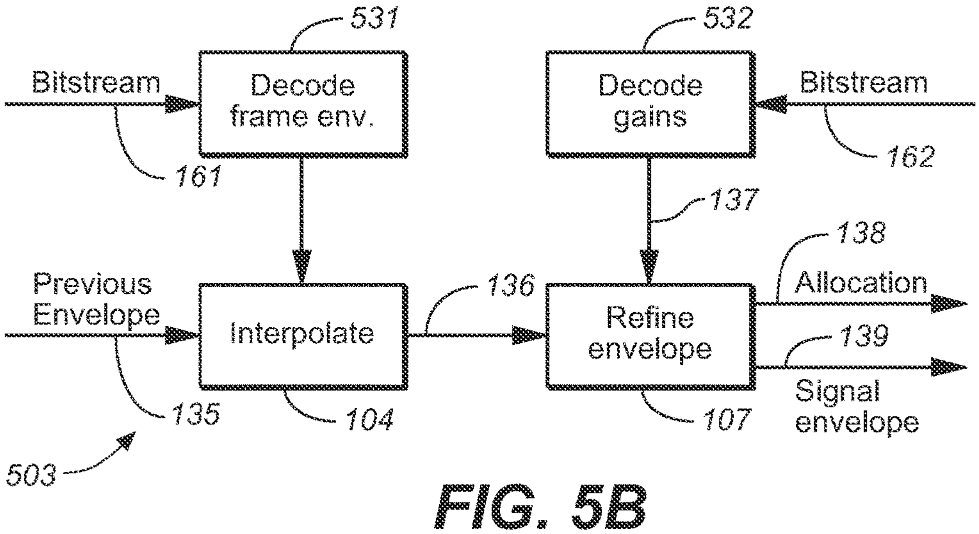

The invention is explained below in an exemplary manner with reference to the accompanying drawings, wherein FIG. 1*a* shows a block diagram of an example audio encoder providing a bitstream at a constant bit-rate;

FIG. 1*b* shows a block diagram of an example audio encoder providing a bitstream at a variable bit-rate;

FIG. 2 illustrates the generation of an example envelope based on a plurality of blocks of transform coefficients;

FIG. 3*a* illustrates example envelopes of blocks of transform coefficients;

FIG. 3*b* illustrates the determination of an example interpolated envelope;

FIG. 4 illustrates example sets of quantizers;

FIG. 5*a* shows a block diagram of an example audio decoder;

FIG. 5*b* shows a block diagram of an example envelope decoder of the audio decoder of FIG. 5*a;*

Figure 5C:
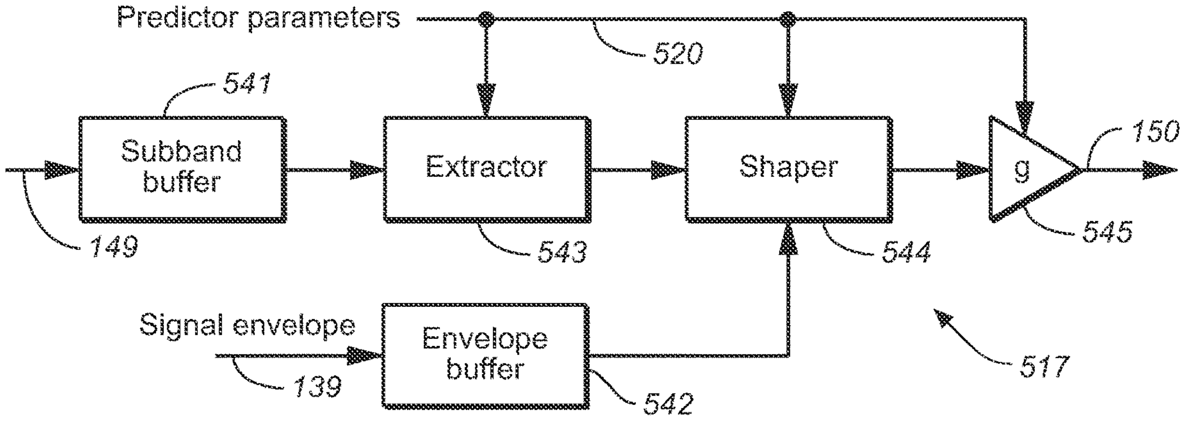
Figure 5D:
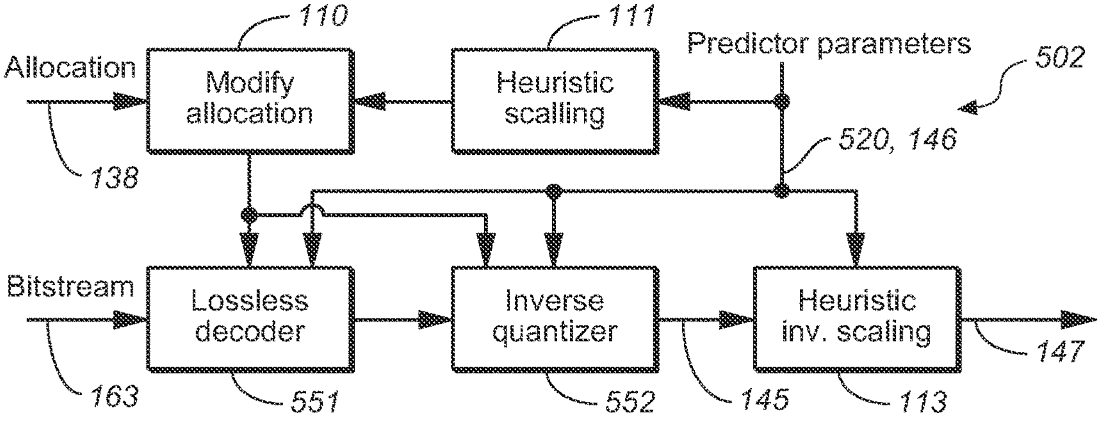

FIG. 5*c* shows a block diagram of an example subband predictor of the audio decoder of FIG. 5*a*; and FIG. 5*d* shows a block diagram of an example spectrum decoder of the audio decoder of FIG. 5*a*.

DETAILED DESCRIPTION

As outlined in the background section, it is desirable to provide a transform-based audio codec which exhibits relatively high coding gains for speech or voice signals. Such a transform-based audio codec may be referred to as a transform-based speech codec or a transform-based voice codec. A transform-based speech codec may be conveniently combined with a generic transform-based audio codec, such as AAC or HE-AAC, as it also operates in the transform domain. Furthermore, the classification of a segment (e.g. a frame) of an input audio signal into speech or non-speech, and the subsequent switching between the generic audio codec and the specific speech codec may be simplified, due to the fact that both codecs operate in the transform domain.

FIG. 1*a* shows a block diagram of an example transform-based speech encoder 100. The encoder 100 receives as an input a block 131 of transform coefficients (also referred to as a coding unit). The block 131 of transform coefficient may have been obtained by a transform unit configured to transform a sequence of samples of the input audio signal from the time domain into the transform domain. The transform unit may be configured to perform an MDCT. The transform unit may be part of a generic audio codec such as AAC or HE-AAC. Such a generic audio codec may make use of different block sizes, e.g. a long block and a short block. Example block sizes are 1024 samples for a long block and 256 samples for a short block. Assuming a sampling rate of 44.1 kHz and an overlap of 50%, a long block covers approx. 20 ms of the input audio signal and a short block covers approx. 5 ms of the input audio signal. Long blocks are typically used for stationary segments of the input audio signal and short blocks are typically used for transient segments of the input audio signal.

Speech signals may be considered to be stationary in temporal segments of about 20 ms. In particular, the spectral envelope of a speech signal may be considered to be stationary in temporal segments of about 20 ms. In order to be able to derive meaningful statistics in the transform domain for such 20 ms segments, it may be useful to provide the transform-based speech encoder 100 with short blocks 131 of transform coefficients (having a length of e.g. 5 ms). By doing this, a plurality of short blocks 131 may be used to derive statistics regarding a time segments of e.g. 20 ms (e.g. the time segment of a long block or frame). Furthermore, this has the advantage of providing an adequate time resolution for speech signals.

Hence, the transform unit may be configured to provide short blocks 131 of transform coefficients, if a current segment of the input audio signal is classified to be speech. The encoder 100 may comprise a framing unit 101 configured to extract a plurality of blocks 131 of transform coefficients, referred to as a set 132 of blocks 131. The set 132 of blocks may also be referred to as a frame. By way of example, the set 132 of blocks 131 may comprise four short blocks of 256 transform coefficients, thereby covering approx. a 20 ms segment of the input audio signal.

The transform-based speech encoder 100 may be configured to operate in a plurality of different modes, e.g. in a short stride mode and in a long stride mode. When being operated in the short stride mode, the transform-based speech encoder 100 may be configured to sub-divide a segment or a frame of the audio signal (e.g. the speech signal) into a set 132 of short blocks 131 (as outlined above). On the other hand, when being operated in the long stride mode, the transform-based speech encoder 100 may be configured to directly process the segment or the frame of the audio signal.

By way of example, when operated in the short stride mode, the encoder 100 may be configured to process four blocks 131 per frame. The frames of the encoder 100 may be relatively short in physical time for certain settings of a video frame synchronous operation. This is particularly the case for an increased video frame frequency (e.g. 100 Hz vs. 50 Hz), which leads to a reduction of the temporal length of the segment or the frame of the speech signal. In such cases, the sub-division of the frame into a plurality of (short) blocks 131 may be disadvantageous, due to the reduced resolution in the transform domain. Hence, a long stride mode may be used to invoke the use of only one block 131 per frame. The use of a single block 131 per frame may also be beneficial for encoding audio signals comprising music (even for relatively long frames). The benefits may be due to the increased resolution in the transform domain, when using only a single block 131 per frame or when using a reduced number of blocks 131 per frame.

In the following the operation of the encoder 100 in the short stride mode is described in further detail. The set 132 of blocks may be provided to an envelope estimation unit 102. The envelope estimation unit 102 may be configured to determine an envelope 133 based on the set 132 of blocks. The envelope 133 may be based on root means squared (RMS) values of corresponding transform coefficients of the plurality of blocks 131 comprised within the set 132 of blocks. A block 131 typically provides a plurality of transform coefficients (e.g. 256 transform coefficients) in a corresponding plurality of frequency bins 301 (see FIG. 3*a*). The plurality of frequency bins 301 may be grouped into a plurality of frequency bands 302. The plurality of frequency bands 302 may be selected based on psychoacoustic considerations. By way of example, the frequency bins 301 may be grouped into frequency bands 302 in accordance to a logarithmic scale or a Bark scale. The envelope 134 which has been determined based on a current set 132 of blocks may comprise a plurality of energy values for the plurality of frequency bands 302, respectively. A particular energy value for a particular frequency band 302 may be determined based on the transform coefficients of the blocks 131 of the set 132, which correspond to frequency bins 301 falling within the particular frequency band 302. The particular energy value may be determined based on the RMS value of these transform coefficients. As such, an envelope 133 for a current set 132 of blocks (referred to as a current envelope 133) may be indicative of an average envelope of the blocks 131 of transform coefficients comprised within the current set 132 of blocks, or may be indicative of an average envelope of blocks 132 of transform coefficients used to determine the envelope 133.

It should be noted that the current envelope 133 may be determined based on one or more further blocks 131 of transform coefficients adjacent to the current set 132 of blocks. This is illustrated in FIG. 2, where the current envelope 133 (indicated by the quantized current envelope 134) is determined based on the blocks 131 of the current set 132 of blocks and based on the block 201 from the set of blocks preceding the current set 132 of blocks. In the illustrated example, the current envelope 133 is determined based on five blocks 131. By taking into account adjacent blocks when determining the current envelope 133, a continuity of the envelopes of adjacent sets 132 of blocks may be ensured.

When determining the current envelope 133, the transform coefficients of the different blocks 131 may be weighted. In particular, the outermost blocks 201, 202 which are taken into account for determining the current envelope 133 may have a lower weight than the remaining blocks 131. By way of example, the transform coefficients of the outermost blocks 201, 202 may be weighted with 0.5, wherein the transform coefficients of the other blocks 131 may be weighted with 1.

It should be noted that in a similar manner to considering blocks 201 of a preceding set 132 of blocks, one or more blocks (so called look-ahead blocks) of a directly following set 132 of blocks may be considered for determining the current envelope 133.

The energy values of the current envelope 133 may be represented on a logarithmic scale (e.g. on a dB scale). The current envelope 133 may be provided to an envelope quantization unit 103 which is configured to quantize the energy values of the current envelope 133. The envelope quantization unit 103 may provide a pre-determined quantizer resolution, e.g. a resolution of 3 dB. The quantization indexes of the envelope 133 may be provided as envelope data 161 within a bitstream generated by the encoder 100. Furthermore, the quantized envelope 134, i.e. the envelope comprising the quantized energy values of the envelope 133, may be provided to an interpolation unit 104.

The interpolation unit 104 is configured to determine an envelope for each block 131 of the current set 132 of blocks based on the quantized current envelope 134 and based on the quantized previous envelope 135 (which has been determined for the set 132 of blocks directly preceding the current set 132 of blocks). The operation of the interpolation unit 104 is illustrated in FIGS. 2, 3*a* and 3*b*. FIG. 2 shows a sequence of blocks 131 of transform coefficients. The sequence of blocks 131 is grouped into succeeding sets 132 of blocks, wherein each set 132 of blocks is used to determine a quantized envelope, e.g. the quantized current envelope 134 and the quantized previous envelope 135. FIG. 3*a* shows examples of a quantized previous envelope 135 and of a quantized current envelope 134. As indicated above, the envelopes may be indicative of spectral energy 303 (e.g. on a dB scale). Corresponding energy values 303 of the quantized previous envelope 135 and of the quantized current envelope 134 for the same frequency band 302 may be interpolated (e.g. using linear interpolation) to determine an interpolated envelope 136. In other words, the energy values 303 of a particular frequency band 302 may be interpolated to provide the energy value 303 of the interpolated envelope 136 within the particular frequency band 302.

It should be noted that the set of blocks for which the interpolated envelopes 136 are determined and applied may differ from the current set 132 of blocks, based on which the quantized current envelope 134 is determined. This is illustrated in FIG. 2 which shows a shifted set 332 of blocks, which is shifted compared to the current set 132 of blocks and which comprises the blocks 3 and 4 of the previous set 132 of blocks (indicated by reference numerals 203 and 201, respectively) and the blocks 1 and 2 of the current set 132 of blocks (indicated by reference numerals 204 and 205, respectively). As a matter of fact, the interpolated envelopes 136 determined based on the quantized current envelope 134 and based on the quantized previous envelope 135 may have an increased relevance for the blocks of the shifted set 332 of blocks, compared to the relevance for the blocks of the current set 132 of blocks.

Hence, the interpolated envelopes 136 shown in FIG. 3*b* may be used for flattening the blocks 131 of the shifted set 332 of blocks. This is shown by FIG. 3*b* in combination with FIG. 2. It can be seen that the interpolated envelope 341 of FIG. 3*b* may be applied to block 203 of FIG. 2, that the interpolated envelope 342 of FIG. 3*b* may be applied to block 201 of FIG. 2, that the interpolated envelope 343 of FIG. 3*b* may be applied to block 204 of FIG. 2, and that the interpolated envelope 344 of FIG. 3*b* (which in the illustrated example corresponds to the quantized current envelope 136) may be applied to block 205 of FIG. 2. As such, the set 132 of blocks for determining the quantized current envelope 134 may differ from the shifted set 332 of blocks for which the interpolated envelopes 136 are determined and to which the interpolated envelopes 136 are applied (for flattening purposes). In particular, the quantized current envelope 134 may be determined using a certain look-ahead with respect to the blocks 203, 201, 204, 205 of the shifted set 332 of blocks, which are to be flattened using the quantized current envelope 134. This is beneficial from a continuity point of view.

The interpolation of energy values 303 to determine interpolated envelopes 136 is illustrated in FIG. 3*b*. It can be seen that by interpolation between an energy value of the quantized previous envelope 135 to the corresponding energy value of the quantized current envelope 134 energy values of the interpolated envelopes 136 may be determined for the blocks 131 of the shifted set 332 of blocks. In particular, for each block 131 of the shifted set 332 an interpolated envelope 136 may be determined, thereby providing a plurality of interpolated envelopes 136 for the plurality of blocks 203, 201, 204, 205 of the shifted set 332 of blocks. The interpolated envelope 136 of a block 131 of transform coefficient (e.g. any of the blocks 203, 201, 204, 205 of the shifted set 332 of blocks) may be used to encode the block 131 of transform coefficients. It should be noted that the quantization indexes 161 of the current envelope 133 are provided to a corresponding decoder within the bitstream. Consequently, the corresponding decoder may be configured to determine the plurality of interpolated envelopes 136 in an analog manner to the interpolation unit 104 of the encoder 100.

The framing unit 101, the envelope estimation unit 102, the envelope quantization unit 103, and the interpolation unit 104 operate on a set of blocks (i.e. the current set 132 of blocks and/or the shifted set 332 of blocks). On the other hand, the actual encoding of transform coefficient may be performed on a block-by-block basis. In the following, reference is made to the encoding of a current block 131 of transform coefficients, which may be any one of the plurality of blocks 131 of the shifted set 332 of blocks (or possibly the current set 132 of blocks in other implementations of the transform-based speech encoder 100).

Furthermore, it should be noted that the encoder 100 may be operated in the so called long stride mode. In this mode, a frame of segment of the audio signal is not sub-divided and is processed as a single block. Hence, only a single block 131 of transform coefficients is determined per frame. When operating in the long stride mode, the framing unit 101 may be configured to extract the single current block 131 of transform coefficients for the segment or the frame of the audio signal. The envelope estimation unit 102 may be configured to determine the current envelope 133 for the current block 131 and the envelope quantization unit 103 may be configured to quantize the single current envelope 133 to determine the quantized current envelope 134 (and to determine the envelope data 161 for the current block 131). When in the long stride mode, envelope interpolation is typically obsolete. Hence, the interpolated envelope 136 for the current block 131 typically corresponds to the quantized current envelope 134 (when the encoder 100 is operated in the long stride mode).

The current interpolated envelope 136 for the current block 131 may provide an approximation of the spectral envelope of the transform coefficients of the current block 131. The encoder 100 may comprise a pre-flattening unit 105 and an envelope gain determination unit 106 which are configured to determine an adjusted envelope 139 for the current block 131, based on the current interpolated envelope 136 and based on the current block 131. In particular, an envelope gain for the current block 131 may be determined such that a variance of the flattened transform coefficients of the current block 131 is adjusted. X(k), k=1, . . . , K may be the transform coefficients of the current block 131 (with e.g. K=256), and E(k), k=1, . . . , K may be the mean spectral energy values 303 of current interpolated envelope 136 (with the energy values E(k) of a same frequency band 302 being equal). The envelope gain a may be determined such that the variance of the flattened transform coefficients $$\tilde{X}(k) = \frac{X(k)}{a \cdot \sqrt{E(k)}}$$

is adjusted. In particular, the envelope gain a may be determined such that the variance is one.

It should be noted that the envelope gain a may be determined for a sub-range of the complete frequency range of the current block 131 of transform coefficients. In other words, the envelope gain a may be determined only based on a subset of the frequency bins 301 and/or only based on a subset of the frequency bands 302. By way of example, the envelope gain a may be determined based on the frequency bins 301 greater than a start frequency bin 304 (the start frequency bin being greater than 0 or 1). As a consequence, the adjusted envelope 139 for the current block 131 may be determined by applying the envelope gain a only to the mean spectral energy values 303 of the current interpolated envelope 136 which are associated with frequency bins 301 lying above the start frequency bin 304. Hence, the adjusted envelope 139 for the current block 131 may correspond to the current interpolated envelope 136, for frequency bins 301 at and below the start frequency bin, and may correspond to the current interpolated envelope 136 offset by the envelope gain a, for frequency bins 301 above the start frequency bin. This is illustrated in FIG. 3*a* by the adjusted envelope 339 (shown in dashed lines).

The application of the envelope gain a 137 (which is also referred to as a level correction gain) to the current interpolated envelope 136 corresponds to an adjustment or an offset of the current interpolated envelope 136, thereby yielding an adjusted envelope 139, as illustrated by FIG. 3*a*. The envelope gain a 137 may be encoded as gain data 162 into the bitstream.

The encoder 100 may further comprise an envelope refinement unit 107 which is configured to determine the adjusted envelope 139 based on the envelope gain a 137 and based on the current interpolated envelope 136. The adjusted envelope 139 may be used for signal processing of the block 131 of transform coefficient. The envelope gain a 137 may be quantized to a higher resolution (e.g. in 1 dB steps) compared to the current interpolated envelope 136 (which may be quantized in 3 dB steps). As such, the adjusted envelope 139 may be quantized to the higher resolution of the envelope gain a 137 (e.g. in 1 dB steps).

Furthermore, the envelope refinement unit 107 may be configured to determine an allocation envelope 138. The allocation envelope 138 may correspond to a quantized version of the adjusted envelope 139 (e.g. quantized to 3 dB quantization levels). The allocation envelope 138 may be used for bit allocation purposes. In particular, the allocation envelope 138 may be used to determine—for a particular transform coefficient of the current block 131—a particular quantizer from a pre-determined set of quantizers, wherein the particular quantizer is to be used for quantizing the particular transform coefficient.

The encoder 100 comprises a flattening unit 108 configured to flatten the current block 131 using the adjusted envelope 139, thereby yielding the block 140 of flattened transform coefficients $\tilde{X}(k)$. The block 140 of flattened transform coefficients $\tilde{X}(k)$ may be encoded using a prediction loop within the transform domain. As such, the block 140 may be encoded using a subband predictor 117. The prediction loop comprises a difference unit 115 configured to determine a block 141 of prediction error coefficients Δ(k), based on the block 140 of flattened transform coefficients $\tilde{X}(k)$ and based on a block 150 of estimated transform coefficients $\hat{X}(k)$, e.g. $\Delta(k)=\tilde{X}(k)-\hat{X}(k)$. It should be noted that due to the fact that the block 140 comprises flattened transform coefficients, i.e. transform coefficients which have been normalized or flattened using the energy values 303 of the adjusted envelope 139, the block 150 of estimated transform coefficients also comprises estimates of flattened transform coefficients. In other words, the difference unit 115 operates in the so-called flattened domain. By consequence, the block 141 of prediction error coefficients Δ(k) is represented in the flattened domain.

The block 141 of prediction error coefficients Δ(k) may exhibit a variance which differs from one. The encoder 100 may comprise a rescaling unit 111 configured to rescale the prediction error coefficients Δ(k) to yield a block 142 of rescaled error coefficients. The rescaling unit 111 may make use of one or more pre-determined heuristic rules to perform the rescaling. As a result, the block 142 of rescaled error coefficients exhibits a variance which is (in average) closer to one (compared to the block 141 of prediction error coefficients). This may be beneficial to the subsequent quantization and encoding.

The encoder 100 comprises a coefficient quantization unit 112 configured to quantize the block 141 of prediction error coefficients or the block 142 of rescaled error coefficients. The coefficient quantization unit 112 may comprise or may make use of a set of pre-determined quantizers. The set of pre-determined quantizers may provide quantizers with different degrees of precision or different resolution. This is illustrated in FIG. 4 where different quantizers 321, 322, 323 are illustrated. The different quantizers may provide different levels of precision (indicated by the different dB values). A particular quantizer of the plurality of quantizers 321, 322, 323 may correspond to a particular value of the allocation envelope 138. As such, an energy value of the allocation envelope 138 may point to a corresponding quantizer of the plurality of quantizers. As such, the determination of an allocation envelope 138 may simplify the selection process of a quantizer to be used for a particular error coefficient. In other words, the allocation envelope 138 may simplify the bit allocation process.

The set of quantizers may comprise one or more quantizers 322 which make use of dithering for randomizing the quantization error. This is illustrated in FIG. 4 showing a first set 326 of pre-determined quantizers which comprises a subset 324 of dithered quantizers and a second set 327 pre-determined quantizers which comprises a subset 325 of dithered quantizers. As such, the coefficient quantization unit 112 may make use of different sets 326, 327 of pre-determined quantizers, wherein the set of pre-determined quantizers, which is to be used by the coefficient quantization unit 112 may depend on a control parameter 146 provided by the predictor 117. In particular, the coefficient quantization unit 112 may be configured to select a set 326, 327 of pre-determined quantizers for quantizing the block 142 of rescaled error coefficient, based on the control parameter 146, wherein the control parameter 146 may depend on one or more predictor parameters provided by the predictor 117. The one or more predictor parameters may be indicative of the quality of the block 150 of estimated transform coefficients provided by the predictor 117.

The quantized error coefficients may be entropy encoded, using e.g. a Huffman code, thereby yielding coefficient data 163 to be included into the bitstream generated by the encoder 100.

The encoder 100 may be configured to perform a bit allocation process. For this purpose, the encoder 100 may comprise bit allocation units 109, 110. The bit allocation unit 109 may be configured to determine the total number of bits 143 which are available for encoding the current block 142 of rescaled error coefficients. The total number of bits 143 may be determined based on the allocation envelope 138. The bit allocation unit 110 may be configured to provide a relative allocation of bits to the different rescaled error coefficients, depending on the corresponding energy value in the allocation envelope 138.

The bit allocation process may make use of an iterative allocation procedure. In the course of the allocation procedure, the allocation envelope 138 may be offset using an offset parameter, thereby selecting quantizers with increased/decreased resolution. As such, the offset parameter may be used to refine or to coarsen the overall quantization. The offset parameter may be determined such that the coefficient data 163, which is obtained using the quantizers given by the offset parameter and the allocation envelope 138, comprises a number of bits which corresponds to (or does not exceed) the total number of bits 143 assigned to the current block 131. The offset parameter which has been used by the encoder 100 for encoding the current block 131 is included as coefficient data 163 into the bitstream. As a consequence, the corresponding decoder is enabled to determine the quantizers which have been used by the coefficient quantization unit 112 to quantize the block 142 of rescaled error coefficients.

As a result of quantization of the rescaled error coefficients, a block 145 of quantized error coefficients is obtained. The block 145 of quantized error coefficients corresponds to the block of error coefficients which are available at the corresponding decoder. Consequently, the block 145 of quantized error coefficients may be used for determining a block 150 of estimated transform coefficients. The encoder 100 may comprise an inverse rescaling unit 113 configured to perform the inverse of the rescaling operations performed by the rescaling unit 113, thereby yielding a block 147 of scaled quantized error coefficients. An addition unit 116 may be used to determine a block 148 of reconstructed flattened coefficients, by adding the block 150 of estimated transform coefficients to the block 147 of scaled quantized error coefficients. Furthermore, an inverse flattening unit 114 may be used to apply the adjusted envelope 139 to the block 148 of reconstructed flattened coefficients, thereby yielding a block 149 of reconstructed coefficients. The block 149 of reconstructed coefficients corresponds to the version of the block 131 of transform coefficients which is available at the corresponding decode. By consequence, the block 149 of reconstructed coefficients may be used in the predictor 117 to determine the block 150 of estimated coefficients.

The block 149 of reconstructed coefficients is represented in the un-flattened domain, i.e. the block 149 of reconstructed coefficients is also representative of the spectral envelope of the current block 131. As outlined below, this may be beneficial for the performance of the predictor 117.

The predictor 117 may be configured to estimate the block 150 of estimated transform coefficients based on one or more previous blocks 149 of reconstructed coefficients. In particular, the predictor 117 may be configured to determine one or more predictor parameters such that a pre-determined prediction error criterion is reduced (e.g. minimized). By way of example, the one or more predictor parameters may be determined such that an energy, or a perceptually weighted energy, of the block 141 of prediction error coefficients is reduced (e.g. minimized). The one or more predictor parameters may be included as predictor data 164 into the bitstream generated by the encoder 100.

The predictor data 164 may be indicative of the one or more predictor parameters. As will be outlined in the present document, the predictor 117 may only be used for a subset of frames or blocks 131 of an audio signal. In particular, the predictor 117 may not be used for the first block 131 of an I-frame (independent frame), which is typically encoded in an independent manner from a preceding block. In addition to this, the predictor data 164 may comprise one or more flags which are indicative of the presence of a predictor 117 for a particular block 131. For the blocks, where the contribution of the predictor is virtually non-significant (for example, when the predictor gain is quantized to zero), it may be beneficial to use the predictor presence flag to signal this situation, which typically requires a significantly reduced number of bits compared to transmitting the zero gain). In other words, the predictor data 164 for a block 131 may comprise one or more predictor presence flags which indicate whether one or more predictor parameters have been determined (and are comprised within the predictor data 164). The use of one or more predictor presence flags may be used to save bits, if the predictor 117 is not used for a particular block 131. Hence, depending on the number of blocks 131 which are encoded without the use of a predictor 117, the use of one or more predictor presence flags may be more bit-rate efficient (in average) than the transmission of default (e.g. zero valued) predictor parameters.

The presence of a predictor 117 may be explicitly transmitted on a per block basis. This allows saving bits when the prediction is not used. By way of example, for I-frames, only three predictor presence flags may be used, because the first block of the I-frame cannot use prediction. In other words, if it is known that a particular block 131 is the first block of an I-frame, then no predictor presence flag may need to be transmitted for this particular block 131 (at it is already known to the corresponding decoder that the particular block 131 does not make use of a predictor 117).

The predictor 117 may make use of a signal model, as described in the patent application U.S. 61/750,052 and the patent applications which claim priority thereof, the content of which is incorporated by reference. The one or more predictor parameters may correspond to one or more model parameters of the signal model.

FIG. 1*b* shows a block diagram of a further example transform-based speech encoder 170. The transform-based speech encoder 170 of FIG. 1*b* comprises many of the components of the encoder 100 of FIG. 1*a*. However, the transform-based speech encoder 170 of FIG. 1*b* is configured to generate a bitstream having a variable bit-rate. For this purpose, the encoder 170 comprises an Average Bit Rate (ABR) state unit 172 configured to keep track of the bit-rate which has been used up by the bitstream for preceding blocks 131. The bit allocation unit 171 uses this information for determining the total number of bits 143 which is available for encoding the current block 131 of transform coefficients.

Overall, the transform-based speech encoders 100, 170 are configured to generate a bitstream which is indicative of or which comprises

- envelope data 161 indicative of a quantized current envelope 134. The quantized current envelope 134 is used to describe the envelope of the blocks of a current set 132 or a shifted set 332 of blocks of transform coefficients.
- gain data 162 indicative of a level correction gain a for adjusting the interpolated envelope 136 of a current block 131 of transform coefficients. Typically a different gain a is provided for each block 131 of the current set 132 or the shifted set 332 of blocks.
- coefficient data 163 indicative of the block 141 of prediction error coefficients for the current block 131. In particular, the coefficient data 163 is indicative of the block 145 of quantized error coefficients. Furthermore, the coefficient data 163 may be indicative of an offset parameter which may be used to determine the quantizers for performing inverse quantization at the decoder.
- predictor data 164 indicative of one or more predictor coefficients to be used to determine a block 150 of estimated coefficients from previous blocks 149 of reconstructed coefficients.

In the following, a corresponding transform-based speech decoder 500 is described in the context of FIGS. 5*a* to 5*d*. FIG. 5*a* shows a block diagram of an example transform-based speech decoder 500. The block diagram shows a synthesis filterbank 504 (also referred to as inverse transform unit) which is used to convert a block 149 of reconstructed coefficients from the transform domain into the time domain, thereby yielding samples of the decoded audio signal. The synthesis filterbank 504 may make use of an inverse MDCT with a pre-determined stride (e.g. a stride of approximately 5 ms or 256 samples).

The main loop of the decoder 500 operates in units of this stride. Each step produces a transform domain vector (also referred to as a block) having a length or dimension which corresponds to a pre-determined bandwidth setting of the system. Upon zero-padding up to the transform size of the synthesis filterbank 504, the transform domain vector will be used to synthesize a time domain signal update of a pre-determined length (e.g. 5 ms) to the overlap/add process of the synthesis filterbank 504.

As indicated above, generic transform-based audio codecs typically employ frames with sequences of short blocks in the 5 ms range for transient handling. As such, generic transform-based audio codecs provide the necessary transforms and window switching tools for a seamless coexistence of short and long blocks. A voice spectral frontend defined by omitting the synthesis filterbank 504 of FIG. 5*a* may therefore be conveniently integrated into the general purpose transform-based audio codec, without the need to introduce additional switching tools. In other words, the transform-based speech decoder 500 of FIG. 5*a* may be conveniently combined with a generic transform-based audio decoder. In particular, the transform-based speech decoder 500 of FIG. 5*a* may make use of the synthesis filterbank 504 provided by the generic transform-based audio decoder (e.g. the AAC or HE-AAC decoder).

From the incoming bitstream (in particular from the envelope data 161 and from the gain data 162 comprised within the bitstream), a signal envelope may be determined by an envelope decoder 503. In particular, the envelope decoder 503 may be configured to determine the adjusted envelope 139 based on the envelope data 161 and the gain data 162). As such, the envelope decoder 503 may perform tasks similar to the interpolation unit 104 and the envelope refinement unit 107 of the encoder 100, 170. As outlined above, the adjusted envelope 109 represents a model of the signal variance in a set of predefined frequency bands 302.

Furthermore, the decoder 500 comprises an inverse flattening unit 114 which is configured to apply the adjusted envelope 139 to a flattened domain vector, whose entries may be nominally of variance one. The flattened domain vector corresponds to the block 148 of reconstructed flattened coefficients described in the context of the encoder 100, 170. At the output of the inverse flattening unit 114, the block 149 of reconstructed coefficients is obtained. The block 149 of reconstructed coefficients is provided to the synthesis filterbank 504 (for generating the decoded audio signal) and to the subband predictor 517.

The subband predictor 517 operates in a similar manner to the predictor 117 of the encoder 100, 170. In particular, the subband predictor 517 is configured to determine a block 150 of estimated transform coefficients (in the flattened domain) based on one or more previous blocks 149 of reconstructed coefficients (using the one or more predictor parameters signaled within the bitstream). In other words, the subband predictor 517 is configured to output a predicted flattened domain vector from a buffer of previously decoded output vectors and signal envelopes, based on the predictor parameters such as a predictor lag and a predictor gain. The decoder 500 comprises a predictor decoder 501 configured to decode the predictor data 164 to determine the one or more predictor parameters.

The decoder 500 further comprises a spectrum decoder 502 which is configured to furnish an additive correction to the predicted flattened domain vector, based on typically the largest part of the bitstream (i.e. based on the coefficient data 163). The spectrum decoding process is controlled mainly by an allocation vector, which is derived from the envelope and a transmitted allocation control parameter (also referred to as the offset parameter). As illustrated in FIG. 5*a*, there may be a direct dependence of the spectrum decoder 502 on the predictor parameters 520. As such, the spectrum decoder 502 may be configured to determine the block 147 of scaled quantized error coefficients based on the received coefficient data 163. As outlined in the context of the encoder 100, 170, the quantizers 321, 322, 323 used to quantize the block 142 of rescaled error coefficients typically depends on the allocation envelope 138 (which can be derived from the adjusted envelope 139) and on the offset parameter. Furthermore, the quantizers 321, 322, 323 may depend on a control parameter 146 provided by the predictor 117. The control parameter 146 may be derived by the decoder 500 using the predictor parameters 520 (in an analog manner to the encoder 100, 170).

As indicated above, the received bitstream comprises envelope data 161 and gain data 162 which may be used to determine the adjusted envelope 139. In particular, unit 531 of the envelope decoder 503 may be configured to determine the quantized current envelope 134 from the envelope data 161. By way of example, the quantized current envelope 134 may have a 3 dB resolution in predefined frequency bands 302 (as indicated in FIG. 3*a*). The quantized current envelope 134 may be updated for every set 132, 332 of blocks (e.g. every four coding units, i.e. blocks, or every 20 ms), in particular for every shifted set 332 of blocks. The frequency bands 302 of the quantized current envelope 134 may comprise an increasing number of frequency bins 301 as a function of frequency, in order to adapt to the properties of human hearing.

The quantized current envelope 134 may be interpolated linearly from a quantized previous envelope 135 into interpolated envelopes 136 for each block 131 of the shifted set 332 of blocks (or possibly, of the current set 132 of blocks). The interpolated envelopes 136 may be determined in the quantized 3 dB domain. This means that the interpolated energy values 303 may be rounded to the closest 3 dB level. An example interpolated envelope 136 is illustrated by the dotted graph of FIG. 3*a*. For each quantized current envelope 134, four level correction gains a 137 (also referred to as envelope gains) are provided as gain data 162. The gain decoding unit 532 may be configured to determine the level correction gains a 137 from the gain data 162. The level correction gains may be quantized in 1 dB steps. Each level correction gain is applied to the corresponding interpolated envelope 136 in order to provide the adjusted envelopes 139 for the different blocks 131. Due to the increased resolution of the level correction gains 137, the adjusted envelope 139 may have an increased resolution (e.g. a 1 dB resolution).

FIG. 3*b* shows an example linear or geometric interpolation between the quantized previous envelope 135 and the quantized current envelope 134. The envelopes 135, 134 may be separated into a mean level part and a shape part of the logarithmic spectrum. These parts may be interpolated with independent strategies such as a linear, a geometrical, or a harmonic (parallel resistors) strategy. As such, different interpolation schemes may be used to determine the interpolated envelopes 136. The interpolation scheme used by the decoder 500 typically corresponds to the interpolation scheme used by the encoder 100, 170.

The envelope refinement unit 107 of the envelope decoder 503 may be configured to determine an allocation envelope 138 from the adjusted envelope 139 by quantizing the adjusted envelope 139 (e.g. into 3 dB steps). The allocation envelope 138 may be used in conjunction with the allocation control parameter or offset parameter (comprised within the coefficient data 163) to create a nominal integer allocation vector used to control the spectral decoding, i.e. the decoding of the coefficient data 163. In particular, the nominal integer allocation vector may be used to determine a quantizer for inverse quantizing the quantization indexes comprised within the coefficient data 163. The allocation envelope 138 and the nominal integer allocation vector may be determined in an analogue manner in the encoder 100, 170 and in the decoder 500.

In order to allow a decoder 500 to synchronize with a received bitstream, different types of frames may be transmitted. A frame may correspond to a set 132, 332 of blocks, in particular to a shifted block 332 of blocks. In particular, so called P-frames may be transmitted, which are encoded in a relative manner with respect to a previous frame. In the above description, it was assumed that the decoder 500 is aware of the quantized previous envelope 135. The quantized previous envelope 135 may be provided within a previous frame, such that the current set 132 or the corresponding shifted set 332 may correspond to a P-frame. However, in a start-up scenario, the decoder 500 is typically not aware of the quantized previous envelope 135. For this purpose, an I-frame may be transmitted (e.g. upon start-up or on a regular basis). The I-frame may comprise two envelopes, one of which is used as the quantized previous envelope 135 and the other one is used as the quantized current envelope 134. I-frames may be used for the start-up case of the voice spectral frontend (i.e. of the transform-based speech decoder 500), e.g. when following a frame employing a different audio coding mode and/or as a tool to explicitly enable a splicing point of the audio bitstream.

The operation of the subband predictor 517 is illustrated in FIG. 5*d*. In the illustrated example, the predictor parameters 520 are a lag parameter and a predictor gain parameter g. The predictor parameters 520 may be determined from the predictor data 164 using a pre-determined table of possible values for the lag parameter and the predictor gain parameter. This enables the bit-rate efficient transmission of the predictor parameters 520.

The one or more previously decoded transform coefficient vectors (i.e. the one or more previous blocks 149 of reconstructed coefficients) may be stored in a subband (or MDCT) signal buffer 541. The buffer 541 may be updated in accordance to the stride (e.g. every 5 ms). The predictor extractor 543 may be configured to operate on the buffer 541 depending on a normalized lag parameter T. The normalized lag parameter T may be determined by normalizing the lag parameter 520 to stride units (e.g. to MDCT stride units). If the lag parameter T is an integer, the extractor 543 may fetch one or more previously decoded transform coefficient vectors T time units into the buffer 541. In other words, the lag parameter T may be indicative of which ones of the one or more previous blocks 149 of reconstructed coefficients are to be used to determine the block 150 of estimated transform coefficients. A detailed discussion regarding a possible implementation of the extractor 543 is provided in the patent application U.S. 61/750,052 and the patent applications which claim priority thereof, the content of which is incorporated by reference.

The extractor 543 may operate on vectors (or blocks) carrying full signal envelopes. On the other hand, the block 150 of estimated transform coefficients (to be provided by the subband predictor 517) is represented in the flattened domain. Consequently, the output of the extractor 543 may be shaped into a flattened domain vector. This may be achieved using a shaper 544 which makes use of the adjusted envelopes 139 of the one or more previous blocks 149 of reconstructed coefficients. The adjusted envelopes 139 of the one or more previous blocks 149 of reconstructed coefficients may be stored in an envelope buffer 542. The shaper unit 544 may be configured to fetch a delayed signal envelope to be used in the flattening from $T_0$ time units into the envelope buffer 542, where $T_0$ is the integer closest to T. Then, the flattened domain vector may be scaled by the gain parameter g to yield the block 150 of estimated transform coefficients (in the flattened domain).

The shaper unit 544 may be configured to determine a flattened domain vector such that the flattened domain vectors at the output of the shaper unit 544 exhibit unit variance in each frequency band. The shaper unit 544 may rely entirely on the data in the envelope buffer 542 to achieve this target. By way of example, the shaper unit 544 may be configured to select the delayed signal envelope such that the flattened domain vectors at the output of the shaper unit 544 exhibit unit variance in each frequency band. Alternatively or in addition, the shaper unit 544 may be configured to measure the variance of the flattened domain vectors at the output of the shaper unit 544 and to adjust the variance of the vectors towards the unit variance property. A possible type of normalization may make use of a single broadband gain (per slot) that normalizes the flattened domain vectors into unit variance vector. The gains may be transmitted from an encoder 100 to a corresponding decoder 500 (e.g. in a quantized and encoded form) within the bitstream.

As an alternative, the delayed flattening process performed by the shaper 544 may be omitted by using a subband predictor 517 which operates in the flattened domain, e.g. a subband predictor 517 which operates on the blocks 148 of reconstructed flattened coefficients. However, it has been found that a sequence of flattened domain vectors (or blocks) does not map well to time signals due to the time aliased aspects of the transform (e.g. the MDCT transform). As a consequence, the fit to the underlying signal model of the extractor 543 is reduced and a higher level of coding noise results from the alternative structure. In other words, it has been found that the signal models (e.g. sinusoidal or periodic models) used by the subband predictor 517 yield an increased performance in the un-flattened domain (compared to the flattened domain).

It should be noted that in an alternative example, the output of the predictor 517 (i.e. the block 150 of estimated transform coefficients) may be added at the output of the inverse flattening unit 114 (i.e. to the block 149 of reconstructed coefficients) (see FIG. 5*a*). The shaper unit 544 of FIG. 5*c* may then be configured to perform the combined operation of delayed flattening and inverse flattening.

Elements in the received bitstream may control the occasional flushing of the subband buffer 541 and of the envelope buffer 542, for example in case of a first coding unit (i.e. a first block) of an I-frame. This enables the decoding of an I-frame without knowledge of the previous data. The first coding unit will typically not be able to make use of a predictive contribution, but may nonetheless use a relatively smaller number of bits to convey the predictor information 520. The loss of prediction gain may be compensated by allocating more bits to the prediction error coding of this first coding unit. Typically, the predictor contribution is again substantial for the second coding unit (i.e. a second block) of an I-frame. Due to these aspects, the quality can be maintained with a relatively small increase in bit-rate, even with a very frequent use of I-frames.

In other words, the sets 132, 332 of blocks (also referred to as frames) comprise a plurality of blocks 131 which may be encoded using predictive coding. When encoding an I-frame, only the first block 203 of a set 332 of blocks cannot be encoded using the coding gain achieved by a predictive encoder. Already the directly following block 201 may make use of the benefits of predictive encoding. This means that the drawbacks of an I-frame with regards to coding efficiency are limited to the encoding of the first block 203 of transform coefficients of the frame 332, and do not apply to the other blocks 201, 204, 205 of the frame 332. Hence, the transform-based speech coding scheme described in the present document allows for a relatively frequent use of I-frames without significant impact on the coding efficiency. As such, the presently described transform-based speech coding scheme is particularly suitable for applications which require a relatively fast and/or a relatively frequent synchronization between decoder and encoder.

As indicated above, during the initialization of an I-frame, the predictor signal buffer, i.e. the subband buffer 541, may be flushed with zeros and the envelope buffer 542 may be filled with only one time slot of values, i.e. may be filled with only a single adjusted envelope 139 (corresponding to the first block 131 of the I-frame). The first block 131 of the I-frame will typically not use prediction. The second block 131 has access to only two time slot of the envelope buffer 542 (i.e. to the envelopes 139 of the first and second blocks 131), the third block to only three time slots (i.e. to envelopes 139 of three blocks 131), and the fourth block 131 to only four time slots (i.e. to envelopes 139 of four blocks 131).

The delayed flattening rule of the spectral shaper 544 (for identifying an envelope for determining the block 150 of estimated transform coefficients (in the flattened domain)) is based on an integer lag value $T_0$ determined by rounding the predictor lag parameter T in units of block size K (wherein the unit of a block size may be referred to as a time slot or as a slot) to the closest integer. However, in the case of an I-frame, this integer lag value $T_0$ could point to unavailable entries in the envelope buffer 542. In view of this, the spectral shaper 544 may be configured to determine the integer lag value $T_0$ such that the integer lag value $T_0$ is limited to the number of envelopes 139 which are stored within the envelope buffer 542, i.e. such that the integer lag value $T_0$ does not point to envelopes 139 which are not available within the envelope buffer 542. For this purpose, the integer lag value $T_0$ may be limited to a value which is a function of the block index inside the current frame. By way of example, the integer lag value $T_0$ may be limited to the index value of the current block 131 (which is to be encoded) within the current frame (e.g. to 1 for the first block 131, to 2 for the second block 131, to 3 for the third block 131 and to 4 for the fourth block 131 of a frame). By doing this, undesirable states and/or distortions due to the flattening process may be avoided.

FIG. 5*d* shows a block diagram of an example spectrum decoder 502. The spectrum decoder 502 comprises a lossless decoder 551 which is configured to decode the entropy encoded coefficient data 163. Furthermore, the spectrum decoder 502 comprises an inverse quantizer 552 which is configured to assign coefficient values to the quantization indexes comprised within the coefficient data 163. As outlined in the context of the encoder 100, 170, different transform coefficients may be quantized using different quantizers selected from a set of pre-determined quantizers, e.g. a finite set of model based scalar quantizers. As shown in FIG. 4, a set of quantizers 321, 322, 323 may comprise different types of quantizers. The set of quantizers may comprise a quantizer 321 which provides noise synthesis (in case of zero bit-rate), one or more dithered quantizers 322 (for relatively low signal-to-noise ratios, SNRs, and for intermediate bit-rates) and/or one or more plain quantizers 323 (for relatively high SNRs and for relatively high bit-rates).

The envelope refinement unit 107 may be configured to provide the allocation envelope 138 which may be combined with the offset parameter comprised within the coefficient data 163 to yield an allocation vector. The allocation vector contains an integer value for each frequency band 302. The integer value for a particular frequency band 302 points to the rate-distortion point to be used for the inverse quantization of the transform coefficients of the particular band 302. In other words, the integer value for the particular frequency band 302 points to the quantizer to be used for the inverse quantization of the transform coefficients of the particular band 302. An increase of the integer value by one corresponds to a 1.5 dB increase in SNR. For the dithered quantizers 322 and the plain quantizers 323, a Laplacian probability distribution model may be used in the lossless coding, which may employ arithmetic coding. One or more dithered quantizers 322 may be used to bridge the gap in a seamless way between low and high bit-rate cases. Dithered quantizers 322 may be beneficial in creating sufficiently smooth output audio quality for stationary noise-like signals.

In other words, the inverse quantizer 552 may be configured to receive the coefficient quantization indexes of a current block 131 of transform coefficients. The one or more coefficient quantization indexes of a particular frequency band 302 have been determined using a corresponding quantizer from a pre-determined set of quantizers. The value of the allocation vector (which may be determined by offsetting the allocation envelope 138 with the offset parameter) for the particular frequency band 302 indicates the quantizer which has been used to determine the one or more coefficient quantization indexes of the particular frequency band 302. Having identified the quantizer, the one or more coefficient quantization indexes may be inverse quantized to yield the block 145 of quantized error coefficients.

Furthermore, the spectral decoder 502 may comprise an inverse-rescaling unit 113 to provide the block 147 of scaled quantized error coefficients. The additional tools and interconnections around the lossless decoder 551 and the inverse quantizer 552 of FIG. 5*d* may be used to adapt the spectral decoding to its usage in the overall decoder 500 shown in FIG. 5*a*, where the output of the spectral decoder 502 (i.e. the block 145 of quantized error coefficients) is used to provide an additive correction to a predicted flattened domain vector (i.e. to the block 150 of estimated transform coefficients). In particular, the additional tools may ensure that the processing performed by the decoder 500 corresponds to the processing performed by the encoder 100, 170.

In particular, the spectral decoder 502 may comprise a heuristic scaling unit 111. As shown in conjunction with the encoder 100, 170, the heuristic scaling unit 111 may have an impact on the bit allocation. In the encoder 100, 170, the current blocks 141 of prediction error coefficients may be scaled up to unit variance by a heuristic rule. As a consequence, the default allocation may lead to a too fine quantization of the final downscaled output of the heuristic scaling unit 111. Hence the allocation should be modified in a similar manner to the modification of the prediction error coefficients.

However, as outlined below, it may be beneficial to avoid the reduction of coding resources for one or more of the low frequency bins (or low frequency bands). In particular, this may be beneficial to counter a LF (low frequency) rumble/noise artifact which happens to be most prominent in voiced situations (i.e. for signal having a relatively large control parameter 146, rfu). As such, the bit allocation/quantizer selection in dependence of the control parameter 146, which is described below, may be considered to be a "voicing adaptive LF quality boost".

The spectral decoder may depend on a control parameter 146 named rfu which may be a limited version of the predictor gain g, e.g.

$$\mathrm{rfu}=\min(1,\max(g,0)).$$

Alternative methods for determining the control parameter 146, rfu, may be used. In particular, the control parameter 146 may be determined using the pseudo code given in Table 1.

TABLE 1

```
f_gain = f_pred_gain;
if (f_gain <−1.0)
   f_rfu = 1.0;
else if (f_gain <0.0)
   f_rfu = −f_gain;
else if (f_gain <1.0)
   f_rfu = f_gain;
else if (f_gain <2.0)
   f_rfu = 2.0 − f_gain;
else // f_gain >=2.0
   f_rfu = 0.0.
```

The variable f_gain and f_pred_gain may be set equal. In particular, the variable f_gain may correspond to the predictor gain g. The control parameter 146, rfu, is referred to as f_rfu in Table 1. The gain f_gain may be a real number.

Compared to the first definition of the control parameter 146, the latter definition (according to Table 1) reduces the control parameter 146, rfu, for predictor gains above 1 and increases the control parameter 146, rfu, for negative predictor gains.

Using the control parameter 146, the set of quantizers used in the coefficient quantization unit 112 of the encoder 100, 170 and used in the inverse quantizer 552 may be adapted. In particular, the noisiness of the set of quantizers may be adapted based on the control parameter 146. By way of example, a value of the control parameter 146, rfu, close to 1 may trigger a limitation of the range of allocation levels using dithered quantizers and may trigger a reduction of the variance of the noise synthesis level. In an example, a dither decision threshold at rfu=0.75 and a noise gain equal to 1−rfu may be set. The dither adaptation may affect both the lossless decoding and the inverse quantizer, whereas the noise gain adaptation typically only affects the inverse quantizer.

It may be assumed that the predictor contribution is substantial for voiced/tonal situations. As such, a relatively high predictor gain g (i.e. a relatively high control parameter 146) may be indicative of a voiced or tonal speech signal. In such situations, the addition of dither-related or explicit (zero allocation case) noise has shown empirically to be counterproductive to the perceived quality of the encoded signal. As a consequence, the number of dithered quantizers 322 and/or the type of noise used for the noise synthesis quantizer 321 may be adapted based on the predictor gain g, thereby improving the perceived quality of the encoded speech signal.

As such, the control parameter 146 may be used to modify the range 324, 325 of SNRs for which dithered quantizers 322 are used. By way of example, if the control parameter 146 rfu<0.75, the range 324 for dithered quantizers may be used. In other words, if the control parameter 146 is below a pre-determined threshold, the first set 326 of quantizers may be used. On the other hand, if the control parameter 146 rfu≥0.75, the range 325 for dithered quantizers may be used. In other words, if the control parameter 146 is greater than or equal to the pre-determined threshold, the second set 327 of quantizers may be used.

Furthermore, the control parameter 146 may be used for modification of the variance and bit allocation. The reason for this is that typically a successful prediction will require a smaller correction, especially in the lower frequency range from 0-1 kHz. It may be advantageous to make the quantizer explicitly aware of this deviation from the unit variance model in order to free up coding resources to higher frequency bands 302. This is described in the context of FIG. 17*c* panel iii of WO2009/086918, the content of which is incorporated by reference. In the decoder 500, this modification may be implemented by modifying the nominal allocation vector according to a heuristic scaling rule (applied by using the scaling unit 111), and at the same time scaling the output of the inverse quantizer 552 according to an inverse heuristic scaling rule using the inverse scaling unit 113. Following the theory of WO2009/086918, the heuristic scaling rule and the inverse heuristic scaling rule should be closely matched. However, it has been found empirically advantageous to cancel the allocation modification for the one or more lowest frequency bands 302, in order to counter occasional problems with LF (low frequency) noise for voiced signal components. The cancelling of the allocation modification may be performed in dependence on the value of the predictor gain g and/or of the control parameter 146. In particular, the cancelling of the allocation modification may be performed only if the control parameter 146 exceeds the dither decision threshold.

As outlined above, an encoder 100, 170 and/or a decoder 500 may comprise a scaling unit 111 which is configured to rescale the prediction error coefficients Δ(k) to yield a block 142 of rescaled error coefficients. The rescaling unit 111 may make use of one or more pre-determined heuristic rules to perform the rescaling. In an example, the rescaling unit 111 may make use of a heuristic scaling rule which comprises the gain d(f), e.g.

$$d(f) = 1 + \frac{7 \cdot rfu^2}{1 + \left(\frac{f}{f_0}\right)^3}$$

where a break frequency $f_0$ may be set to e.g. 1000 Hz. Hence, the rescaling unit 111 may be configured to apply a frequency dependent gain d(f) to the prediction error coefficients to yield the block 142 of rescaled error coefficients. The inverse rescaling unit 113 may be configured to apply an inverse of the frequency dependent gain d(f). The frequency dependent gain d(f) may be dependent on the control parameter rfu 146. In the above example, the gain d(f) exhibits a low pass character, such that the prediction error coefficients are attenuated more at higher frequencies than at lower frequencies and/or such that the prediction error coefficients are emphasized more at lower frequencies than at higher frequencies. The above mentioned gain d(f) is always greater or equal to one. Hence, in a preferred embodiment, the heuristic scaling rule is such that the prediction error coefficients are emphasized by a factor one or more (depending on the frequency).

It should be noted that the frequency-dependent gain may be indicative of a power or a variance. In such cases, the scaling rule and the inverse scaling rule should be derived based on a square root of the frequency-dependent gain, e.g. based on $\sqrt{d(f)}$.

The degree of emphasis and/or attenuated may depend on the quality of the prediction achieved by the predictor 117. The predictor gain g and/or the control parameter rfu 146 may be indicative of the quality of the prediction. In particular, a relatively low value of the control parameter rfu 146 (relatively close to zero) may be indicative of a low quality of prediction. In such cases, it is to be expected that the prediction error coefficients have relatively high (absolute) values across all frequencies. A relatively high value of the control parameter rfu 146 (relatively close to one) may be indicative of a high quality of prediction. In such cases, it is to be expected that the prediction error coefficients have relatively high (absolute) values for high frequencies (which are more difficult to predict). Hence, in order to achieve unit variance at the output of the rescaling unit 111, the gain d(f) may be such that in case of a relatively low quality of prediction, the gain d(f) is substantially flat for all frequencies, whereas in case of a relatively high quality of prediction, the gain d(f) has a low pass character, to increase or boost the variance at low frequencies. This is the case for the above mentioned rfu-dependent gain d(f).

As outlined above, the bit allocation unit 110 may be configured to provide a relative allocation of bits to the different rescaled error coefficients, depending on the corresponding energy value in the allocation envelope 138. The bit allocation unit 110 may be configured to take into account the heuristic rescaling rule. The heuristic rescaling rule may be dependent on the quality of the prediction. In case of a relatively high quality of prediction, it may be beneficial to assign a relatively increased number of bits to the encoding of the prediction error coefficients (or the block 142 of rescaled error coefficients) at high frequencies than to the encoding of the coefficients at low frequencies. This may be due to the fact that in case of a high quality of prediction, the low frequency coefficients are already well predicted, whereas the high frequency coefficients are typically less well predicted. On the other hand, in case of a relatively low quality of prediction, the bit allocation should remain unchanged.

The above behavior may be implemented by applying an inverse of the heuristic rules/gain d(f) to the current adjusted envelope 139, in order to determine an allocation envelope 138 which takes into account the quality of prediction.

The adjusted envelope 139, the prediction error coefficients and the gain d(f) may be represented in the log or dB domain. In such case, the application of the gain d(f) to the prediction error coefficients may correspond to an "add" operation and the application of the inverse of the gain d(f) to the adjusted envelope 139 may correspond to a "subtract" operation.

It should be noted that various variants of the heuristic rules/gain d(f) are possible. In particular, the fixed frequency dependent curve of low pass character $$\left(1 + \left(\frac{f}{f_0}\right)^3\right)^{-1}$$

may be replaced by a function which depends on the envelope data (e.g. on the adjusted envelope 139 for the current block 131). The modified heuristic rules may depend both on the control parameter rfu 146 and on the envelope data.

In the following different ways for determining a predictor gain ρ, which may correspond to the predictor gain g, are described. The predictor gain ρ may be used as an indication of the quality of the prediction. The prediction residual vector (i.e. the block 141 of prediction error coefficients z may be given by: z=x−ρy, where x is the target vector (e.g. the current block 140 of flattened transform coefficients or the current block 131 of transform coefficients), y is a vector representing the chosen candidate for prediction (e.g. a previous blocks 149 of reconstructed coefficients), and ρ is the (scalar) predictor gain.

w≥0 may be a weight vector used for the determination of the predictor gain ρ. In some embodiments, the weight vector is a function of the signal envelope (e.g. a function of the adjusted envelope 139, which may be estimated at the encoder 100, 170 and then transmitted to the decoder 500). The weight vector typically has the same dimension as the target vector and the candidate vector. An i-th entry of the vector x may be denoted by $x_i$ (e.g. i=1, . . . , K).

There are different ways for defining the predictor gain ρ. In an embodiment, the predictor gain ρ is an MMSE (minimum mean square error) gain defined according to the minimum mean squared error criterion. In this case, the predictor gain ρ may be computed using the following formula:

$$\rho = \frac{\sum_i x_i y_i}{\sum_i y_i^2}.$$

Such a predictor gain ρ typically minimizes the mean squared error defined as $$D = \sum_i (x_i - \rho y_i)^2.$$

It is often (perceptually) beneficial to introduce weighting to the definition of the means squared error D. The weighting may be used to emphasize the importance of a match between x and y for perceptually important portions of the signal spectrum and deemphasize the importance of a match between x and y for portions of the signal spectrum that are relatively less important. Such an approach results in the following error criterion:

$$D = \sum_i (x_i - \rho y_i)^2 w_i,$$

which leads to the following definition of the optimal predictor gain (in the sense of the weighted mean squared error):

$$\rho = \frac{\sum_i w_i x_i y_i}{\sum_i w_i y_i^2}.$$

The above definition of the predictor gain typically results in a gain that is unbounded. As indicated above, the weights $w_i$ of the weight vector w may be determined based on the adjusted envelope 139. For example, the weight vector w may be determined using a predefined function of the adjusted envelope 139. The predefined function may be known at the encoder and at the decoder (which is also the case for the adjusted envelope 139). Hence, the weight vector may be determined in the same manner at the encoder and at the decoder. Another possible predictor gain formula is given by $$\rho = \frac{2C}{E_x + E_y},$$

where $$C = \sum_i w_i x_i y_i,\ E_x = \sum_i w_i x_i^2 \text{ and } E_y = \sum_i w_i y_i^2.$$

This definition of the predictor gain yields a gain that is always within the interval [−1, 1]. An important feature of the predictor gain specified by the latter formula is that the predictor gain ρ facilitates a tractable relationship between the energy of the target signal x and the energy of the residual signal z. The LTP residual energy may be expressed as:

$$\sum_i w_i z_i^2 = E_x(1 - \rho^2).$$

The control parameter rfu 146 may be determined based on the predictor gain g using the above mentioned formulas. The predictor gain g may be equal to the predictor gain ρ, determined using any of the above mentioned formulas.

As outlined above, the encoder 100, 170 is configured to quantize and encoder the residual vector z (i.e. the block 141 of prediction error coefficients). The quantization process is typically guided by the signal envelope (e.g. by the allocation envelope 138) according to an underlying perceptual model in order to distribute the available bits among the spectral components of the signal in a perceptually meaningful way. The process of rate allocation is guided by the signal envelope (e.g. by the allocation envelope 138), which is derived from the input signal (e.g. from the block 131 of transform coefficients). The operation of the predictor 117 typically changes the signal envelope. The quantization unit 112 typically makes use of quantizers which are designed assuming operation on a unit variance source. Notably in case of high quality prediction (i.e. when the predictor 117 is successful), the unit variance property may no longer be the case, i.e. the block 141 of prediction error coefficients may not exhibit unit variance.

It is typically not efficient to estimate the envelope of the block 141 of prediction error coefficients (i.e. for the residual z) and to transmit this envelope to the decoder (and to re-flatten the block 141 of prediction error coefficients using the estimated envelope). Instead, the encoder 100 and the decoder 500 may make use of a heuristic rule for rescaling the block 141 of prediction error coefficients (as outlined above). The heuristic rule may be used to rescale the block 141 of prediction error coefficients, such that the block 142 of rescaled coefficients approaches the unit variance. As a result of this, quantization results may be improved (using quantizers which assume unit variance).

Furthermore, as has already been outlined, the heuristic rule may be used to modify the allocation envelope 138, which is used for the bit allocation process. The modification of the allocation envelope 138 and the rescaling of the block 141 of prediction error coefficients are typically performed by the encoder 100 and by the decoder 500 in the same manner (using the same heuristic rule).

A possible heuristic rule d(f) has been described above. In the following another approach for determining a heuristic rule is described. An inverse of the weighted domain energy prediction gain may be given by $p \in [0,1]$ such that $\|z\|_w^2 = p\|x\|_w^2$, wherein $\|z\|_w^2$ indicates the squared energy of the residual vector (i.e. the block 141 of prediction error coefficients) in the weighted domain and wherein $\|x\|_w^2$ indicates the squared energy of the target vector (i.e. the block 140 of flattened transform coefficients) in the weighted domain.

The following assumptions may be made

1. The entries of the target vector x have unit variance. This may be a result of the flattening performed by the flattening unit 108. This assumption is fulfilled depending on the quality of the envelope based flattening performed by the flattening unit 108.
2. The variance of the entries of the prediction residual vector z are of the form of $$E\{z^2(i)\} = \min\left\{\frac{t}{w(i)}, 1\right\}$$

for i=1, . . . , K and for some $t \geq 0$. This assumption is based on the heuristic that a least squares oriented predictor search leads to an evenly distributed error contribution in the weighted domain, such that the residual vector $\sqrt{w}z$ is more or less flat. Furthermore, it may be expected that the predictor candidate is close to flat which leads to the reasonable bound $E\{z^2(i)\} \leq 1$. It should be noted that various modifications of this second assumption may be used.

In order to estimate the parameter t, one may insert the above mentioned two assumptions into the prediction error formula $$\left(\text{e.g. } D = \sum_i (x_i - \rho y_i)^2 w_i\right)$$

and thereby provide the "water level type" equation $$\sum_i \min\{t, w(i)\} = p \sum_i w(i)$$

It can be shown that there is a solution to the above equation in the interval $t \in [0, \max(w(i))]$. The equation for finding the parameter t may be solved using sorting routines.

The heuristic rule may then be given by $$d(i) = \max\left\{\frac{w(i)}{t}, 1\right\},$$

wherein i=1, . . . , K identifies the frequency bin. The inverse of the heuristic scaling rule is given by $$\frac{1}{d(i)} = \min\left\{\frac{t}{w(i)}, 1\right\}.$$

The inverse of the heuristic scaling rule is applied by the inverse rescaling unit 113. The frequency-dependent scaling rule depends on the weights $w(i)=w_i$. As indicated above, the weights w(i) may be dependent on or may correspond to the current block 131 of transform coefficients (e.g. the adjusted envelope 139, or some predefined function of the adjusted envelope 139).

It can be shown that when using the formula $$\rho = \frac{2C}{E_x + E_y}$$

to determine the predictor gain, the following relation applies: $p = 1 - \rho^2$.

Hence, a heuristic scaling rule may be determined in various different ways. It has been shown experimentally that the scaling rule which is determined based on the above mentioned two assumptions (referred to as scaling method B) is advantageous compared to the fixed scaling rule d(f). In particular, the scaling rule which is determined based on the two assumptions may take into account the effect of weighting used in the course of a predictor candidate search. The scaling method B is conveniently combined with the definition of the gain $$\rho = \frac{2C}{E_x + E_y},$$

because of the analytically tractable relationship between the variance of the residual and the variance of the signal (which facilitates derivation of p as outlined above).

In the following, a further aspect for improving the performance of the transform-based audio coder is described. In particular, the use of a so called variance preservation flag is proposed. The variance preservation flag may be determined and transmitted on a per block 131 basis. The variance preservation flag may be indicative of the quality of the prediction. In an embodiment, the variance preservation flag is off, in case of a relatively high quality of prediction, and the variance preservation flag is on, in case of a relatively low quality of prediction. The variance preservation flag may be determined by the encoder 100, 170, e.g. based on the predictor gain ρ and/or based on the predictor gain g. By way of example, the variance preservation flag may be set to "on" if the predictor gain ρ or g (or a parameter derived therefrom) is below a pre-determined threshold (e.g. 2 dB) and vice versa. As outlined above, the inverse of the weighted domain energy prediction gain p typically depends on the predictor gain, e.g. $p=1-\rho^2$. The inverse of the parameter p may be used to determine a value of the variance preservation flag. By way of example, 1/p (e.g. expressed in dB) may be compared to a pre-determined threshold (e.g. 2 dB), in order to determine the value of the variance preservation flag. If 1/p is greater than the pre-determined threshold, the variance preservation flag may be set "off" (indicating a relatively high quality of prediction), and vice versa.

The variance preservation flag may be used to control various different settings of the encoder 100 and of the decoder 500. In particular, the variance preservation flag may be used to control the degree of noisiness of the plurality of quantizers 321, 322, 323. In particular, the variance preservation flag may affect one or more of the following settings Adaptive noise gain for zero bit allocation. In other words, the noise gain of the noise synthesis quantizer 321 may be affected by the variance preservation flag.

Range of dithered quantizers. In other words, the range 324, 325 of SNRs for which dithered quantizers 322 are used may be affected by the variance preservation flag.

Post-gain of the dithered quantizers. A post-gain may be applied to the output of the dithered quantizers, in order to affect the mean square error performance of the dithered quantizers. The post-gain may be dependent on the variance preservation flag.

Application of heuristic scaling. The use of heuristic scaling (in the rescaling unit 111 and in the inverse rescaling unit 113) may be dependent on the variance preservation flag.

An example of how the variance preservation flag may change one or more settings of the encoder 100 and/or the decoder 500 is provided in Table 2.

TABLE 2

| Setting type | Variance preservation off | Variance preservation on |
|---|---|---|
| Noise gain | $g_N = (1 - \text{rfu})$ | $g_N = \sqrt{(1 - \text{rfu}^2)}$ |
| Range of dithered quantizers | Depends on the control parameter rfu | Is fixed to a relatively large range (e.g. to the largest possible range) |
| Post-gain of the dithered quantizers. $\gamma_o = \frac{\sigma_X^2}{\sigma_X^2 + \frac{\Delta^2}{12}}$; $\gamma_1 = \sqrt{\gamma_o}$ | $\gamma = \gamma_o$. | $\gamma = \max(\gamma_o, g_N \cdot \gamma_1)$ |
| Heuristic scaling rule | on | off |

In the formula for the post-gain, $\sigma_x^2 = E\{X^2\}$ is a variance of one or more of the coefficients of the block 141 of prediction error coefficients (which are to be quantized), and $\Delta$ is a quantizer step size of a scalar quantizer (612) of the dithered quantizer to which the post-gain is applied.

As can be seen from the example of Table 2, the noise gain $g_N$ of the noise synthesis quantizer 321 (i.e. the variance of the noise synthesis quantizer 321) may depend on the variance preservation flag. As outlined above, the control parameter rfu 146 may be in the range [0, 1], wherein a relatively low value of rfu indicates a relatively low quality of prediction and a relatively high value of rfu indicates a relatively high quality of prediction. For rfu values in the range of [0, 1], the left column formula provides lower noise gains $g_N$ than the right column formula. Hence, when the variance preservation flag is on (indicating a relatively low quality of prediction), a higher noise gain is used than when the variance preservation flag is off (indicating a relatively high quality of prediction). It has been shown experimentally that this improves the overall perceptual quality.

As outlined above, the SNR range of the 324, 325 of the dithered quantizers 322 may vary depending on the control parameter rfu. According to Table 2, when the variance preservation flag is on (indicating a relatively low quality of prediction), a fixed large range of dithered quantizers 322 is used (e.g. the range 324). On the other hand, when the variance preservation flag is off (indicating a relatively high quality of prediction), different ranges 324, 325 are used, depending on the control parameter rfu.

The determination of the block 145 of quantized error coefficients may involve the application of a post-gain $\gamma$ to the quantized error coefficients, which have been quantized using a dithered quantizer 322. The post-gain $\gamma$ may be derived to improve the MSE performance of a dithered quantizer 322 (e.g. a quantizer with a subtractive dither). The post-gain may be given by:

$$\gamma = \frac{\sigma_X^2}{\sigma_X^2 + \frac{\Delta^2}{12}}.$$

It has been shown experimentally that the perceptual coding quality can be improved, when making the post-gain dependent on the variance preservation flag. The above mentioned MSE optimal post-gain is used, when the variance preservation flag is off (indicating a relatively high quality of prediction). On the other hand, when the variance preservation flag is on (indicating a relatively low quality of prediction), it may be beneficial to use a higher post-gain (determined in accordance to the formula of the right hand side of Table 2).

As outlined above, heuristic scaling may be used to provide blocks 142 of rescaled error coefficients which are closer to the unit variance property than the blocks 141 of prediction error coefficients. The heuristic scaling rules may be made dependent on the control parameter 146. In other words, the heuristic scaling rules may be made dependent on the quality of prediction. Heuristic scaling may be particularly beneficial in case of a relatively high quality of prediction, whereas the benefits may be limited in case of a relatively low quality of prediction. In view of this, it may be beneficial to only make use of heuristic scaling when the variance preservation flag is off (indicating a relatively high quality of prediction).

In the present document, a transform-based speech encoder 100, 170 and a corresponding transform-based speech decoder 500 have been described. The transform-based speech codec may make use of various aspects which allow improving the quality of encoded speech signals. The speech codec may make use of relatively short blocks (also referred to as coding units), e.g. in the range of 5 ms, thereby ensuring an appropriate time resolution and meaningful statistics for speech signals. Furthermore, the speech codec may provide an adequate description of a time varying spectral envelope of the coding units. In addition, the speech codec may make use of prediction in the transform domain, wherein the prediction may take into account the spectral envelopes of the coding units. Hence, the speech codec may provide envelope aware predictive updates to the coding units. Furthermore, the speech codec may use pre-determined quantizers which adapt to the results of the prediction. In other words, the speech codec may make use of prediction adaptive scalar quantizers.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A method of audio signal encoding, comprising:

receiving an input audio signal;

transforming a sequence of samples of the input audio signal into a current block of transform coefficients;

estimating a spectral envelope associated with the current block;

flattening the current block of transform coefficients based on the spectral envelope;

determining an envelope gain based on spectral energy values of the spectral envelope;

determining an allocation envelope based on the spectral envelope and one or more parameters of a model, where the one or more model parameters are indicative of a fundamental frequency of a multi-sinusoidal signal model;

adjusting the allocation envelope based on the envelope gain; and entropy coding the flattened transform coefficients based on a variance of at least one transform coefficient estimated based on the adjusted allocation envelope.

2. An apparatus comprising:

one or more processors;

memory storing instructions that when executed by the one or more processors, cause the one or more processors to perform operations comprising:

receiving an input audio signal;

transforming a sequence of samples of the input audio signal into a current block of transform coefficients;

estimating a spectral envelope associated with the current block;

flattening the current block of transform coefficients based on the spectral envelope;

determining an envelope gain based on spectral energy values of the spectral envelope;

determining an allocation envelope based on the spectral envelope and one or more parameters of a model, where the one or more model parameters are indicative of a fundamental frequency of a multi-sinusoidal signal model;

adjusting the allocation envelope based on the envelope gain; and entropy coding the flattened transform coefficients based on a variance of at least one transform coefficient estimated based on the adjusted allocation envelope.

3. A non-transitory computer-readable medium storing instructions that, when executed by one or more processors, causes the one or more processors to perform operations comprising:

receiving an input audio signal;

transforming a sequence of samples of the input audio signal into a current block of transform coefficients;

estimating a spectral envelope associated with the current block;

flattening the current block of transform coefficients based on the spectral envelope;

determining an envelope gain based on spectral energy values of the spectral envelope;

determining an allocation envelope based on the spectral envelope and one or more parameters of a model, where the one or more model parameters are indicative of a fundamental frequency of a multi-sinusoidal signal model;

adjusting the allocation envelope based on the envelope gain; and entropy coding the flattened transform coefficients based on a variance of at least one transform coefficient estimated based on the adjusted allocation envelope.

* * * * *